(12) United States Patent
Sugiyama

(10) Patent No.: US 8,014,230 B2
(45) Date of Patent: Sep. 6, 2011

(54) ADAPTIVE ARRAY CONTROL DEVICE, METHOD AND PROGRAM, AND ADAPTIVE ARRAY PROCESSING DEVICE, METHOD AND PROGRAM USING THE SAME

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 390 days.

(21) Appl. No.: 12/297,871

(22) PCT Filed: Apr. 12, 2007

(86) PCT No.: PCT/JP2007/058089
§ 371 (c)(1),
(2), (4) Date: Oct. 20, 2008

(87) PCT Pub. No.: WO2007/123047
PCT Pub. Date: Nov. 1, 2007

(65) Prior Publication Data
US 2010/0171662 A1 Jul. 8, 2010

(30) Foreign Application Priority Data
Apr. 20, 2006 (JP) ................................ 2006-117286

(51) Int. Cl.
*G01S 3/86* (2006.01)
(52) U.S. Cl. ...................................... 367/135
(58) Field of Classification Search .................. 367/135, 367/124; 342/383
See application file for complete search history.

(56) References Cited

U.S. PATENT DOCUMENTS

| 2006/0122832 A1 | 6/2006 | Takiguchi et al. |
| 2009/0073040 A1* | 3/2009 | Sugiyama ...................... 342/378 |
| 2009/0086578 A1* | 4/2009 | Sugiyama ...................... 367/138 |
| 2009/0121934 A1* | 5/2009 | Sugiyama ...................... 342/378 |
| 2010/0171662 A1* | 7/2010 | Sugiyama ...................... 342/378 |

FOREIGN PATENT DOCUMENTS

| JP | 08-122424 | 5/1996 |
| JP | 10-207490 | 8/1998 |
| JP | 11-052988 | 2/1999 |

(Continued)

OTHER PUBLICATIONS

S. Affes et al., "Robust Adaptive Beamforming Via LMS-Like Target Tracking," IEEE Proceedings of International Conference on Acoustics, Speech and Signal Processing, vol. IV, pp. 269-272, Apr. 1994.

(Continued)

*Primary Examiner* — Dan Pihulic
(74) *Attorney, Agent, or Firm* — Foley & Lardner LLP

(57) ABSTRACT

To provide an adaptive array control device, method, and program adapted to be able to output an enhanced target signal by precisely carrying out a coefficient update control of a plurality of signals input from a group of sensors arranged in an array, the coefficient update control being less influenced by the frequency characteristics of the signals and directions of a target signal and interference.
The invention includes: a gain control section 900 having an analyzing section 903 which analyzes characteristics of a target signal and a correcting section 905 which corrects a target signal power estimated value in response to the analysis result; and blocking matrix circuits 310 and 320 which receive and process signals from a plurality of sensors having different intervals.

28 Claims, 12 Drawing Sheets

FOREIGN PATENT DOCUMENTS

| | | |
|---|---|---|
| JP | 2000-181498 A | 6/2000 |
| JP | 2003-140700 A | 5/2003 |
| JP | 2003-271191 A | 9/2003 |
| JP | 2004-289762 A | 10/2004 |
| JP | 2005-077731 A | 3/2005 |
| JP | 2005-249816 A | 9/2005 |

OTHER PUBLICATIONS

M. Brandstein et al., "Microphone Arrays," Ch. 1, Fig. 1.1, Springer-Verlag, Berlin, 2001.

M. Brandstein et al., "Microphone Arrays," Ch. 5, Springer-Verlag, Berlin, 2001.

I. Claesson et al., "A Spatial Filtering Approach to Robust Adaptive Beaming," IEEE Transactions on Antennas and Propagation, vol. 40:9, Sep. 1992, pp. 1093-1096.

O.L. Frost, III, "An Algorithm for Linearly Constrained Adaptive Array Processing," Proceedings of the IEEE, vol. 60:8, Aug. 1972, pp. 926-935.

J. E. Greenberg et al., "Evaluation of an Adaptive Beamforming Method for Hearing Aids," J. Acoust. Soc. Am 91:3, Mar. 1992, pp. 1662-1676.

L. J. Griffiths, "An Alternative Approach to Linearly Constrained Adaptive Beamforming," IEEE Transactions on Antennas and Propagation, vol. AP-30:1, Jan. 1982, pp. 27-34.

O. Hoshuyama et al., "A Robust Generalized Sidelobe Canceller with a Blocking Matrix Using Leaky Adaptive Filters," IEEE Transactions of the Institute of Electronics, Information and Communication, vol. 79:9, Sep. 1996, pp. 1516-1524.

O. Hoshuyama et al., "A Realtime Robust Adaptive Microphone Array Controlled by an SNR Estimate," IEEE Proceedings of ICASSP, Apr. 1998, pp. 3604-3608.

O Hoshuyama et al., "An adaptive microphone array with good sound quality using auxiliary fixed beamformers and its DSP implementation," IEEE Proceedings of ICASSP, Mar. 1991, pp. 949-952.

S. Haykin, "Radar Array Processing for Angle of Arrival Estimation," Chapter 4, Array Signal Processing, Prentice-Hall, Englewood Clifs, 1993, pp. 194-292.

P. P. Vaidyanathan, "Multirate Systems and Filter Banks," Pt. 2, Chapter 5, IEEE Proceedings of ICASSP, pp. 189-271.

\* cited by examiner

ADAPTIVE ARRAY CONTROL DEVICE, METHOD AND PROGRAM, AND ADAPTIVE ARRAY PROCESSING DEVICE, METHOD AND PROGRAM USING THE SAME

This application is the National Phase of PCT/JP2007/058089, filed Apr. 12, 2007, which claims priority to Japanese Application No. 2006-117286, filed Apr. 20, 2006, the disclosures of which are hereby incorporated by reference in their entirety.

TECHNICAL FIELD

The present invention relates to signal processing of an adaptive array which spatio-selectively receives incoming signals such as audio using array sensors such as microphones. In particular, the present invention relates to adaptive array control device, method and program, and adaptive array processing device, method, and program using the same.

BACKGROUND ART

Conventionally, in the field of audio signal acquisition, sonars and wireless communications, a speech enhancement device by means of an adaptive microphone array and a wireless transceiver by means of an adaptive antenna array have been known, for example.

Such a device is capable of enhancing and receiving only a particular signal from a plurality of signal sources, which is an application of an adaptive array technique. As sensors, microphones, ultrasonic sensors, sonar receivers, and radio wave antennas may be used. Here, a case of using microphones as sensors will be described.

Hereinafter, in order to simplify the description, a case where microphones are arranged on a line at equal interval will be considered. Further, it assumes that a target audio source is sufficiently distant from the line on which the microphones are arranged, and that the direction of the target audio source is orthogonal to the line.

A microphone array filters signals input to a plurality of microphones, and then adds them to form a spatial filter. With this spatial filter, only a signal incoming from a predefined direction, or a switch target signal, is enhanced, and signals other than the target signal are attenuated.

An adaptive microphone array is an array of microphones having a function of adaptively varying the spatial filter characteristics.

As a configuration of an adaptive microphone array, a "generalized sidelobe canceller" disclosed in Non-Patent Document 1, the configuration disclosed in Non-Patent Document 2, the configuration disclosed in Non-Patent Document 3, the "frost beamformer" disclosed in Non-Patent Document 4, and the configuration disclosed in Non-Patent Document 5, have been known, for example.

A "generalized sidelobe canceller", which is a basic adaptive array processing device disclosed in Non-Patent Document 1, includes a fixed beamformer, a blocking matrix circuit, and a multi-input canceller.

The blocking matrix circuit includes an adaptive blocking matrix circuit including adaptive filters. The fixed beamformer processes a plurality of sensor signals and enhances a target signal. The blocking matrix circuit suppresses the target signal included in the plurality of sensor signals, and relatively enhances interferences.

The adaptive blocking matrix circuit subtracts a pseudo target signal generated by the adaptive filters from the plurality of the sensor signals with the fixed beamformer output being used as a reference signal, and supplies to a multi-input canceller. The adaptive filter coefficient of the adaptive blocking matrix circuit is to be updated so as to minimize an output of the adaptive blocking matrix circuit using the fixed beamformer output and an output of the adaptive blocking matrix circuit.

The multi-input canceller subtracts a pseudo interference generated by the adaptive filters from the fixed beamformer output with an output of the blocking matrix circuit being used as a reference signal. In the signal obtained by the subtraction processing, the target signal is enhanced and the interference is suppressed, which becomes an array device output. Through the subtraction processing, correlation of the output signal with respect to the interference is eliminated.

The adaptive filter coefficient of the multi-input canceller is updated to minimize the multi-input canceller output using the blocking matrix circuit output and the multi-input canceller output.

As the fixed beamformer, a delay-and-sum beamformer which delays respective sensor signals and adds them, a filter-and-sum beamformer which filters and adds them, may be used. Those fixed beamformers are described in Non-Patent Document 6 in detail.

The delay-and-sum beamformer delays a plurality of sensor signals for only the unique number of samples of each signal, and after multiplying a unique coefficient by each signal, calculates the sum and outputs it.

The delay time of each signal is set such that after each sensor signal is delayed, the phases of the target signal included therein will become the same. Consequently, the target signal included in the output of the delay-and-sum beamformer is enhanced.

On the other hand, for the interference incoming from a direction different from that of the target signal, as the phases are different from each other in the respective delayed signals, the interferences are offset each other by addition and attenuated. As such, in the output of the delay-and-sum beamformer, the target signal is enhanced and the interferences are attenuated.

The filter-and-sum beamformer has a configuration such that delaying and constant multiplying with respect to sensor signals in the delay-and-sum beamformer are replaced with filters. Those filters can be made such that effects of delaying and constant multiplying in the delay-and-sum beamformer differ with respect to respective frequencies. As such, the target signal enhancing effect is more enhanced compared to that of the delay-and-sum beamformer with respect to signals in which spectrum is not flat.

The adaptive blocking matrix circuit and the multi-input canceller include a plurality of adaptive filters. As such adaptive filters, structures of FIR filters, IIR filters, and lattice filters may be used. Further, as a coefficient update algorithm of those adaptive filters, NLMS algorithm (learning identification method or normalized LMS algorithm), RLS algorithm (sequential minimum square method), a projection algorithm, a gradient method, an LS algorithm (minimum square method), a block adaptive algorithm, and adaptive algorithm of transform region may be used.

Further, when performing coefficient updating, a tap coefficient constraint adaptive algorithm applying constraint to a coefficient value to be newly calculated, a leak adaptive algorithm, and a tap norm constraint adaptive algorithm applying constraint to a coefficient value norm may be used. Those coefficient update algorithms with constraint are described in Non-Patent Document 7 in detail.

In the coefficient update of the adaptive blocking matrix circuit, the enhanced interference becomes an unnecessary signal for coefficient update, and in the coefficient update of the multi-input canceller, the enhanced target signal becomes an unnecessary signal for coefficient update, both of which disturb coefficient update. As such, in either case, the adaptive filter coefficient is disturbed, so that uncomfortable breathing noises are caused in the output signal of the array processing device.

In order to prevent the noises, it is necessary to make the coefficient update step size small. However, a small step size causes a delay of the speed with which the characteristics of the adaptive blocking matrix circuit follows the movement of the target signal, so that the quality of the adaptive array device output which is the final output is deteriorated.

In order to solve this problem, adaptive mode control devices are disclosed in Non-Patent Document 8 and Non-Patent Document 9.

Here, in the method disclosed in Non-Patent Document 8, presence of the interference is detected using correlation between signals obtained from adjacent sensors. By halting coefficient update when the interference is detected, a fine output of the adaptive array device can be obtained. In this method, as it is developed to be applied for hearing aid, microphone intervals are set to be wide, so the signal band is restricted from about 600 Hz to 1200 Hz to prevent spatial aliasing.

In an application by using normal audio signals, as the audio power may sometimes be also present outside this frequency range, presence of interferences cannot be detected accurately. Further, as it is configured to control coefficient update of only multi-input canceller while assuming a fixed blocking matrix circuit, it cannot be directly applied to the adaptive blocking matrix circuit.

In the method disclosed in Non-Patent Document 9, presence of interference is detected using a power ratio of the target signal to the interference (SIR). The power estimation of the target signals is performed using a fixed beamformer output. The power estimation of the interference is performed using an output of the adaptive blocking matrix circuit. The ratio of these estimation values (that is, estimation values of SIR) is compared with a threshold.

If the SIR (power ratio of target signal to interference) is larger than the threshold, as the target signal is prevailing in the input signal and effects of the target signal are small, coefficient update will be performed in the adaptive blocking matrix circuit. In contrast, as the target signal interrupts coefficient update of the multi-input canceller, coefficient update of the multi-input canceller is halted.

If SIR is smaller than the threshold, the coefficient update is halted in the adaptive blocking matrix circuit, and coefficient update is performed in the multi-input canceller.

In this method, however, the adaptive blocking matrix circuit does not exhibit sufficient performance until the adaptive filter coefficient included in the adaptive blocking matrix circuit is converged, so that estimation of the interference power becomes inaccurate. As such, particularly in the initial timing of operation, errors may be easily caused in the coefficient update control of the adaptive blocking matrix circuit and the multi-input canceller, leading to deterioration in the output audio of the array processing device.

In order to solve this problem, Non-Patent Document 10 discloses an adaptive mode control device having a dedicated fixed blocking matrix circuit.

In the method disclosed in Non-Patent Document 10, power estimation of interference is performed using a dedicated fixed blocking matrix circuit. As such, desired performance can be achieved irrespective of the convergence of the adaptive filter coefficient included in the adaptive blocking matrix circuit, which enables accurate interference power estimation.

Next, FIG. 11 shows an adaptive mode processing device of another conventional example.

The conventional example (adaptive mode processing device) shown in FIG. 11 is configured such that the above-described adaptive array processing device disclosed in Non-Patent Document 9 is combined with the adaptive mode control device disclosed in Non-Patent Document 10.

In this configuration, the adaptive array processing device disclosed in Non-Patent Document 9 includes a fixed beamformer 200, an adaptive blocking matrix circuit 300, a delay element 400, and a multi-input canceller 500. Further, the adaptive mode control device includes a blocking matrix circuit 310, an SIR estimation section 700, and a comparator section 800.

The fixed beamformer 200 of the adaptive array processing device processes signals obtained from M pieces of sensors $100_0$ to $100_{M-1}$ to thereby enhance a target signal.

The adaptive blocking matrix circuit 300 suppresses the target signal included in the plurality of sensor signals, and relatively enhances interference. This is achieved by generating pseudo target signals by a plurality of adaptive filters with an output of the fixed beamformer 200 being used as a reference signal, and subtracting them from signals obtained from M pieces of the sensors $100_0$ to $100_{M-1}$. In that case, the coefficient of the adaptive filter is updated such that an output of the adaptive blocking matrix circuit 300 is minimized, by using an output of the fixed beamformer 200 and an output of the adaptive blocking matrix circuit 300.

The delay element 400 delays an output of the fixed beamformer 200 by L sample, and supplies it to the multi-input canceller 500. The value of L is set such that the phases of the target signal component in the output of the delay element 400 and the target signal component in the output of the adaptive blocking matrix circuit 300 become the same. For example, it may be set to the sum of the group delay time of the fixed beamformer 200 and a time corresponding to about one fourth to a half of the number of taps of the adaptive blocking matrix circuit 300.

The multi-input canceller 500 receives and performs processing on a signal formed by delaying the output signal of the fixed beamformer 200 and an output signal of the adaptive blocking matrix circuit 300 to thereby suppress interference, and further enhances the target signal relatively. The multi-input canceller 500 receives the enhanced interference as a reference signal from the adaptive blocking matrix circuit 300, and as a signal correlated to this signal, generates a pseudo interference by adaptive filters. The generated pseudo interference is subtracted from the enhanced target signal which is an output of the delay element 400. This output is transmitted to the output terminal 600.

The adaptive filter coefficient of the multi-input canceller 500 is updated, using the output of the adaptive blocking matrix circuit 300 and the output signal transmitted to the output terminal 600, so as to minimize the output signal.

The output of the adaptive blocking matrix circuit 300 to be used in coefficient update of the adaptive blocking matrix circuit 300 includes interference and a suppressed target signal. However, as the adaptive blocking matrix circuit 300 can affect only the target signal component, the interference is output as it is. In other words, the adaptive blocking matrix circuit 300 can minimize only the target signal component, and the interference component included in this output disturbs coefficient update.

With the disturbing, the adaptive filter coefficient included in the adaptive blocking matrix circuit 300 is disordered, so that the signal transmitted to the multi-input canceller 500 becomes unstable. As a result, the output of the multi-input canceller 500, that is, the output of the entire adaptive array device, is disturbed, causing uncomfortable breathing noises.

In order to prevent the noises, SIR is estimated using the plurality of sensor signals, and the coefficient update of the adaptive blocking matrix circuit 300 is controlled using the estimated value.

Similarly, the target signal enhanced in the coefficient update of the multi-input canceller 500 becomes an unnecessary signal for coefficient update, disturbing the coefficient update. With the disturbing, the adaptive filter coefficient included in the multi-input canceller 500 is disordered, causing uncomfortable breathing noises in the adaptive array device output. As such, same as the adaptive blocking matrix circuit 300, SIR of the plurality of sensor signals is estimated, and coefficient update of the multi-input canceller 500 is controlled with the estimated value.

The SIR estimation section 700 performs SIR estimation using the output of the blocking matrix circuit 310 and the output of the fixed beamformer 200.

Power estimation of the target signal is performed using the output of the fixed beamformer 200. Power estimation of the interference is performed using the output of the fixed blocking matrix circuit 310. The two pieces of estimated power information are supplied to the SIR estimation section 700, and the ratio is calculated to serve as an estimated SIR value.

The estimated SIR value calculated by the SIR estimation section 700 is transmitted from the SIR estimation section 700 to the comparator section 800. The comparator section 800 compares the estimated SIR value with a threshold.

If the estimated SIR value is larger than the threshold, as the target signal is prevailing in the input signal so that effect of the interference is small, a control signal for performing coefficient update in the adaptive blocking matrix circuit is generated, and the signal is supplied to the adaptive blocking matrix circuit 300. In contrast, as the target signal disturbs in the coefficient update of the multi-input canceller 500, a control signal for halting coefficient update of the multi-input canceller 500 is generated, and the signal is supplied to the multi-input canceller 500.

If the estimated SIR value is smaller than the threshold, coefficient update is halted in the adaptive blocking matrix circuit, and a signal for performing coefficient update in the multi-input canceller is generated and supplied to the adaptive blocking matrix circuit 300 and the multiple input canceller 500, respectively.

FIG. 12 shows an exemplary configuration of the fixed blocking matrix circuit 310, which is configured with a subtracter 311 for calculating the difference between the $i^{th}$ sensor signal $X_i(k)$ and the $(i+1)^{th}$ sensor signal $X_{i+1}(k)$.

Here, k is an indicator showing the time, and i is an integer in a range from 0 to M−2. The output signal Z(k) of the blocking matrix circuit 310 becomes $X_i(k)-X_{i+1}(k)$. With respect to the target signal incoming from the front, $X_i(k)$ and $X_{i+1}(k)$ are equal, so that Z(k)=0 is established. With respect to interference incoming from another direction, Z(k) is not zero. As such, the fixed blocking matrix circuit 310 has an advantage of suppressing the target signal.

Non-Patent Document 1: IEEE TRANSACTIONS ON ANTENNAS AND PROPAGATION, VOL. 30, NO. 1, PP. 27-34, January 1982

Non-Patent Document 2: IEEE TRANSACTIONS ON ANTENNAS AND PROPAGATION, VOL. 40, NO. 9, PP. 1093-1096, September 1992

Non-Patent Document 3: THE TRANSACTIONS OF THE INSTITUTE OF ELECTRONICS, INFORMATION AND COMMUNICATION ENGINEERS A, VOL. 79, NO. 9, PP. 1516-1524, September 1996

Non-Patent Document 4: PROCEEDINGS OF IEEE, VOL. 60, No. 8, PP. 926-935, August 1972

Non-Patent Document 5: IEEE PROCEEDINGS OF INTERNATIONAL CONFERENCE ON ACOUSTICS, SPEECH, AND SIGNAL PROCESSING, VOL. IV, PP. 269-272, April, 1994

Non-Patent Document 6: CH. 4, ARRAY SIGNAL PROCESSING, PRENTICE-HALL, ENGLEWOOD CLIFFS, 1993

Non-Patent Document 7: MICROPHONE ARRAYS, SPRINGER, 2001

Non-Patent Document 8: JOURNAL OF ACOUSTICAL SOCIETY OF AMERICA, VOL. 91, NO. 3, PP. 1662-1676, March 1992

Non-Patent Document 9: IEEE PROCEEDINGS OF ICASSP, PP. 3605-3608, APR. 1998

Non-Patent Document 10: IEEE PROCEEDINGS OF ICASSP, PP. 949-952, MAR. 1999

DISCLOSURE OF THE INVENTION

Problems to be Solved by the Invention

In the above-described conventional example, in order to prevent distortion which may be caused due to spatial aliasing, the maximum interval between sensors arranged in an array is set depending on the wavelength and the sound speed. Further, in practice, the number M of sensors also has the upper limit. As such, the frequency characteristics of the fixed beamformer performing the power estimation of the target signal are not flat, and the selectivity based on the direction is not sufficient.

Similarly, the frequency characteristics of the fixed blocking matrix performing power estimation of the interference is not flat, and the selectivity based on the direction is not sufficient.

As such, in the conventional art including one shown in FIG. 11, errors may easily be caused in the power estimation of the signals depending on the frequency characteristics of the input signal and the directions of the target signal and the interferences. At the same time, if an inappropriate coefficient update control or the like is performed according to the estimated power, there has been a problem of causing the performance degradation in the entire device.

OBJECT OF THE INVENTION

It is an object of the present invention to provide an adaptive array control device, method and program, and an adaptive array processing device, method and program, capable of performing accurate coefficient update control which is less influenced by effects of frequency characteristics and the incoming direction of a target signal to thereby acquire a high-quality array processing output which is less influenced by effects of the frequency characteristics of an input signal and directions of the target signal and interference.

Means for Solving the Problems

In order to achieve the above object, an adaptive array control device according to the present invention includes: an analyzing section which analyzes a first array-processed signal formed by enhancing a target signal, included in a plurality of signals transmitted from a plurality of sensors arranged in an array, with respect to other signals, and acquires signal characteristics; a correcting section which corrects the first array-processed signal corresponding to the acquired signal characteristics to output as a first corrected array-processed signal; an SIR estimating section which estimates a ratio of interference with respect to the target signal (SIR) according to the first corrected array-processed signal; and an arithmetic control section which generates a control signal for controlling speed and accuracy of parameter adjustment in a predetermined adaptive array processing section using the estimated SIR value.

With this configuration, as an estimation value of each power of the target signal is corrected adaptively corresponding to the characteristics of the target signal, spatio-frequency selectivity with high flatness can be realized, so that each power of the target signal can be estimated accurately.

As such, by incorporating this into the adaptive array processing device, a coefficient update control of the device can be performed properly, so that it is possible to output-control high-quality array processing which is less influenced by the frequency characteristics of an input signal and directions of the target signal and the interference.

Here, the adaptive array control device further includes a second array-processed signal generating section which attenuates the target signal with respect to the other signals to thereby generate a second array-processed signal, and the SIR estimating section is configured to estimate and specify a ratio of the target signal to the interferences (SIR) according to the second array-processed signal generated by the second array-processed signal generating section and the first corrected array-processed signal. Further, the arithmetic control section may have an adaptive array processing control function to control, using the estimated SIR value, the speed and the accuracy of parameter adjustment required for adaptive array processing performed by the adaptive array processing section.

With this configuration, as an estimation value of each power of the target signal and of the interference is corrected adaptively corresponding to the characteristics of the target signal, spatio-frequency selectivity with high flatness can be realized, so that each power of the target signal and the interference can be estimated accurately. As such, coefficient update control of the adaptive array processing device can be performed properly.

Further, the adaptive array control device according to the present invention includes: an analyzing section which analyzes a first array-processed signal formed by enhancing a target signal, included in a plurality of signals transmitted from a plurality of sensors arranged in an array, with respect to other signals, and acquires signal characteristics; a correcting section which corrects the first array-processed signal corresponding to the acquired signal characteristics to output as a first corrected array-processed signal; a second array-processed signal generating section which attenuates the target signal with respect to the other signals to generate a second array-processed signal; a calculation section which calculates relative magnitude relationship between the first corrected array-processed signal and the second array-processed signal; and an arithmetic control section which generates a control signal for controlling the speed and accuracy of parameter adjustment in a predetermined adaptive array processing section using the magnitude relationship calculated by the calculation section.

Even with this configuration, an adaptive array control device which functions as the same manner as the above-described adaptive array control device can be realized.

Here, the second array-processed signal generating section may be configured to have a sensor pair difference information outputting function to set a plurality of pairs of sensors having different sensor intervals from a plurality of pieces of array sensor information input, and to calculate and output an output difference between each of the pairs of sensors.

Further, the second array-processed signal generating section may be configured to have a plurality of filters for filtering respective output differences, an adder which adds filter outputs, and an addition result outputting function to externally output an addition result of the adder.

Further, an adaptive array controlling method according to the present invention includes: a signal characteristic analyzing step for analyzing a first array-processed signal generated by enhancing a target signal, included in a plurality of signals transmitted from a plurality of sensors arranged in an array, with respect to other signals, and acquiring signal characteristics thereof; a first array-processed signal correcting step for correcting the first array-processed signal corresponding to the acquired signal characteristics and outputting as a first corrected array-processed signal; an SIR estimation step for estimating a ratio of the target signal to interference (SIR) according to the first corrected array-processed signal; and an adaptive array processing control step for setting and controlling the speed and accuracy of parameter adjustment in the predetermined adaptive array processing to be in an optimum state using the estimated SIR value estimated in the SIR estimation step.

As such, according to the present invention, as an estimation value of each power of the target signal is corrected adaptively corresponding to the characteristics of the target signal, spatio-frequency selectivity with high flatness can be realized, so that each power of the target signal can be estimated accurately. As such, by incorporating this into the adaptive array processing method, coefficient update control or the like can be performed properly, so that it is possible to output-control high-quality array processing which is less influenced by the frequency characteristics of an input signal and directions of the target signal and interferences.

Here, between the first array-processed signal correcting step and the SIR estimation step, it is also acceptable to set a second array-processed signal generation step for calculating a second array-processed signal by attenuating the target signal with respect to the other signals, and the SIR estimation step may be an SIR estimation step for estimating the ratio of the target signal to the interference (SIR) according to the second array-processed signal and the first corrected array-processed signal.

Further, the adaptive array controlling method according to the present invention may include: a signal characteristic analyzing step for analyzing a first array-processed signal generated by enhancing a target signal, included in a plurality of signals transmitted from a plurality of sensors arranged in an array, with respect to other signals, and acquiring signal characteristics thereof; a first array-processed signal correcting step for correcting the first array-processed signal corresponding to the acquired signal characteristics and outputting as a first corrected array-processed signal; a second array-processed signal generation step for acquiring a second array-processed signal by attenuating the target signal with respect to the other signals; a magnitude relationship specifying step for acquiring a relative magnitude relationship between the corrected first corrected array-processed signal and the generated second array-processed signal; and an adaptive array processing controlling step for setting and controlling the speed and accuracy of parameter adjustment in the predetermined adaptive array processing to be in an optimum state according to the specified relative magnitude relationship.

Even with this configuration, an adaptive array controlling method which functions as the same manner as that of the above-described adaptive array controlling method can be achieved.

Here, the content of the second array-processed signal generation step may be configured to set a plurality of pairs of sensors having different sensor intervals based on a plurality of pieces of array sensor information input, and generate a second array-processed signal using output differences of the pairs of sensors.

Further, regarding the second array-processed signal generation step, the content may be configured to filter the respective output differences to thereby specify a plurality of filtering results corresponding to the respective differences, and to generate the second array-processed signal using the sum of the plurality of filtering results specified.

Further, an adaptive array controlling program according to the present invention is configured to cause a computer to perform: a signal characteristic analyzing function to analyze a first array-processed signal generated by enhancing a target signal, included in a plurality of signals transmitted from a plurality of sensors arranged in an array, with respect to other signals, and acquire signal characteristics; a first array-processed signal correcting function to correct the first array-processed signal according to the generated signal characteristics to thereby acquire a first corrected array-processed signal; an output difference calculation function to calculate output differences between a plurality of pairs of sensors having different sensor intervals; a second array-processed signal generating function to acquire a second array-processed signal by attenuating the target signal with respect to the other signals using the calculated output differences; a magnitude relationship specifying function to acquire a relative magnitude relationship between the first corrected array-processed signal and the generated second array-processed signal; and an adaptive array processing controlling function to set and control speed and accuracy of parameter adjustment in adaptive array processing the first array-processed signal to be in an optimum state according to the relative magnitude relationship specified.

Even with this configuration, an adaptive array control program which functions as the same manner as the performing content of the above-described adaptive array control device can be achieved.

Further, the adaptive array processing device according to the present invention includes: a first array-processed signal generating section which processes to enhance a target signal, included in a plurality of signals transmitted from a group of sensors arranged in an array, with respect to other signals to thereby generate a first array-processed signal; a second array-processed signal generating section which attenuates the target signal with respect to the other signals to thereby generate a second array-processed signal; a correlation eliminating section which eliminates a signal component correlated to the second array-processed signal from the first array-processed signal; an analyzing section which analyzes the first array-processed signal to thereby acquire signal characteristics; a correcting section which corrects the first array-processed signal according to the signal characteristics acquired by the analyzing section and outputs the signal as a first corrected array-processed signal; a third array-processed signal generating section which attenuates the target signal with respect to the other signals to thereby generate a third array-processed signal; a calculation section which calculates a relative magnitude relationship between the generated third array-processed signal and the first corrected array-processed signal; and an adaptive array processing section which performs adaptive array processing on the first array-processed signal to thereby eliminate the effects of the interferences to thereby enhance and output the first array-processed signal.

Further, the adaptive array processing device includes an arithmetic control section which generates a control signal for controlling the speed and accuracy of parameter adjustment in the adaptive array processing of the adaptive array processing section using the magnitude relationship output from the calculation section, and by using the control signal output from the arithmetic control section, operation of at least one of the first array-processed signal generating section, the second array-processed signal generating section, and the correlation eliminating section is controlled.

As such, according to the present invention, as an estimation value of each power of the target signal is corrected adaptively corresponding to the characteristics of the target signal, spatio-frequency selectivity with high flatness can be realized, so that each power of the target signal can be estimated accurately. As such, by incorporating this into the adaptive array processing method, coefficient update control with such processing method can be performed properly, so that it is possible to output high-quality array processing which is less influenced by the frequency characteristics of an input signal and directions of the target signal and the interferences.

Here, the second array-processed signal generating section may be configured to have a sensor pair difference outputting function to set a plurality of pairs of sensors having difference sensor intervals based on a plurality of pieces of array sensor information input, calculate output differences of the pairs of sensors, and output the output differences of the pairs of sensors.

Further, the second array-processed signal generating section may be configured to include a plurality of filters for filtering the respective output differences and an adder to add filter outputs, and have an addition result outputting function to externally output an addition result of the adder.

Further, the adaptive array processing method according to the present invention includes: a first array-processed signal generation step for enhancing a target signal included in a plurality of signals transmitted from a group of sensors arranged in an array with respect to other signals to thereby generate a first array-processed signal; a second array-processed signal generation step for attenuating the target signal with respect to the other signals to thereby acquire a second array-processed signal; a signal characteristic generation step for analyzing the first array-processed signal when eliminating a signal component correlated to the generated second array-processed signal from the first array-processed signal and outputting, to thereby acquire signal characteristics; a first array-processed signal correcting step for correcting the first array-processed signal corresponding to the generated signal characteristic to thereby acquire a first corrected array-processed signal; a third array-processed signal generation step for attenuating the target signal with respect to other signals to thereby generate a third array-processed signal; a magnitude relationship specifying step for acquiring relative magnitude relationship between the corrected first corrected array-processed signal and the generated second array-processed signal; and an adaptive array processing controlling step for controlling speed and accuracy of parameter adjustment in the adaptive array processing with respect to the first array-processed signal according to the specified relative magnitude relationship.

As such, with this configuration, as an estimation value of each power of the target signal is corrected adaptively corresponding to the characteristics of the target signal in the same manner as the case of the adaptive array controlling method, spatio-frequency selectivity with high flatness can be realized, so that each power of the target signal can be estimated accurately. Therefore, coefficient update control can be performed rapidly and properly, so that it is possible to acquire a high-quality array processing output which is less influenced by the frequency characteristics of the input signal and directions of the target signal and interferences.

Here, the executing content of the third array-processed signal generation step may be configured to set a plurality of pairs of sensors having different sensor intervals from a plurality of pieces of array sensor information input, and to generate the third array-processed signal using the output differences of the pair of sensors (claim 16).

Further, the executing content of the third array-processed signal generation step may be configured to filter respective output differences to specify a plurality of filtering results corresponding to the respective differences, and to generate the third array-processed signal using the sum of the plurality of specified filtering results.

Further, the adaptive array processing program according to the present invention is configured to cause a computer to perform: a first array-processed signal generating function to enhance a target signal included in a plurality of signals, transmitted from a group of sensors arranged in an array, with respect to other signals to thereby generate a first array-processed signal; a second array-processed signal generating function to attenuate the target signal with respect to the other signals to thereby acquire a second array-processed signal; a correlated component eliminating function to eliminate a signal component correlated to the second array-processed signal from the first array-processed signal and output; a signal characteristic generating function to analyze the first array-processed signal in which the correlated components are eliminated to thereby acquire a signal characteristic; a first array-processed signal correcting function to correct the first array-processed signal corresponding to the generated signal characteristics to thereby acquire a first corrected array-processed signal; an output difference calculating function to set a plurality of pairs of sensors having different sensor intervals from a plurality of pieces of array sensor information input, and calculate output differences between the pairs of sensors; a second array-processed signal generating function to generate a second array-processed signal, in which the target signal is attenuated with respect to the other signals, using the output differences; a magnitude relationship specifying function to acquire relative magnitude relationship between the corrected first corrected array-processed signal and the generated second array-processed signal; and an adaptive array processing controlling function to control speed and accuracy of parameter adjustment in the adaptive array processing to be in an optimum state with respect to the first array-processed signal using the specified relative magnitude relationship.

Even with this configuration, it is possible to obtain an adaptive array processing program which functions as almost the same as each executing content of the adaptive array processing device or the adaptive array processing method.

Effects of the Invention

According to the present invention, as an estimation value of the target signal power is corrected adaptively corresponding to the characteristics of the target signal and the interference power is estimated while maintaining excellent spatio-frequency selectivity, spatio-frequency selectivity with high flatness can be realized, so that each power of the target signal (or target signal and interferences) can be estimated accurately. As such, coefficient update control of the processing device can be performed properly. Thereby, it is possible to provide excellent adaptive array control device, method and program and adaptive array processing device, method and program using the same, capable of acquiring a high-quality array processing output which is less influenced by the frequency characteristics of an input signal and directions of the target signal and interferences, which could not have been achieved conventionally.

BEST MODE FOR CARRYING OUT THE INVENTION

Hereinafter, exemplary embodiments of an adaptive array control device according to the invention and an adaptive array processing device using it will be described based on the drawings.

First Exemplary Embodiment

FIGS. 1 to 9 show a first exemplary embodiment of an adaptive array processing device according to the invention.

First, referring to FIG. 1, an adaptive array processing device according to the first exemplary embodiment includes a fixed beamformer 200 serving as a first array-processed signal generating section which processes to enhance a target signal, included in a plurality of signals transmitted from a group of M pieces of sensors $100_0$ to $100_{M-1}$ arranged in an array, with respect to other signals, to thereby generate a first array-processed signal, and an adaptive blocking matrix circuit 300 serving as a second array-processed signal generating section which attenuates the target signal with respect to the other signals to thereby generate a second array-processed signal.

Further, the adaptive array processing device includes a blocking matrix circuit 310, a multipole input canceller 500 serving as an adaptive array processing section for outputting the enhanced target signal, a comparator section 800 serving as an arithmetic control section, a delaying element 400 which delays and transmits the first array-processed signal to the multipole input canceller 500, a gain control section 900, and an SIR estimating section 700 which estimates a ratio of interferences with respect to the target signal according to the first corrected array-processed signal.

The comparator section 800 serving as the arithmetic control section has a coefficient update control function to control operation of the multipole input canceller 500 and the adaptive blocking matrix circuit 300, and to control coefficient update and the like of adjustment parameters to thereby achieve high-quality array processing output from the multipole input canceller (adaptive array processing section) 500.

Note that the blocking matrix circuit 310, the SIR estimating section 700, the gain control section 900, and the arithmetic control section (comparator section) 800 configure an adaptive mode control unit (adaptive array control device) 1200.

In the adaptive mode control unit (adaptive array control device) 1200, the blocking matrix circuit (second array-processed signal generating section) 310 may be configured of a multiple blocking matrix circuit (second array-processed signal generating section) 320 having a sensor pair difference output function which sets a plurality of pair of sensors having different sensor distances based on a plurality of pieces of array sensor information transmitted from a group of M pieces of sensors $100_0$ to $100_{M-1}$ arranged in an array, calculates output differences between the pair of sensors, and outputs them, as shown in FIG. 4 and after as described later.

In that case, the blocking matrix circuit (second array-processed signal generating section) 320 shown in FIG. 4 includes a plurality of filters for filtering output differences respectively and an adder which adds filter outputs, and also has an addition result outputting function to output the addition result of the adder to the outside. Specific description will be given later.

As shown in FIG. 2, the gain control section 900 includes an analyzing section 903 which analyzes the first array-processed signal and acquires the signal characteristics, and a spectrum correcting section 905 serving as a correcting section which corrects the first array-processed signal corresponding to the signal characteristics acquired by the analyzing section 903 and outputs the signal as a first corrected array-processed signal. The SIR estimating section 700 is configured to estimate a ratio of interferences with respect to the target signal (SIR) according to the first corrected array-processed signal output from the gain control section 900 and the second array-processed signal.

Note that estimation of SIR may be performed by using the first array-processed signal instead of the first corrected array-processed signal.

Further, the adaptive array processing device includes a multi-input canceller (adaptive array processing section, correlation elimination section) 500 which adaptive-array-processes the first array-processed signal corresponding to the estimation value estimated by the SIR estimating section 700 and eliminates effects of the interference to thereby enhance and output the first array-processed signal, and a comparator section 800 serving as an arithmetic control section which sets and controls the operation for the adaptive array processing of the multi-input canceller 500 to be in an optimum state according to the control information from the SIR estimating section 700.

The multi-input canceller 500 is configured to have a function as a correlation elimination section which eliminates a signal component correlating to the second array-processed signal from the first array-processed signal to thereby enhance and output the first array-processed signal.

Further, the SIR estimating section 700 may be configured to estimate and specify a ratio of the target signal to the interference (SIR) according to the second array-processed signal generated by the blocking matrix circuit (second array-processed signal generating section) 320 and the first corrected array-processed signal.

Note that the SIR estimating section 700 may be replaced with a calculation section (not shown) which calculates the relative magnitude relationship between the first corrected array-processed signal and the second array-processed signal.

Further, the arithmetic control unit 800 has a control signal generating function to generate a control signal for controlling the speed and accuracy of parameter adjustment in adaptive array processing according to information of the relative magnitude relationship between the first corrected array-processed signal and the second array-processed signal, and a function (adaptive array processing control function) to operate-control, using the control signal, at least one of the fixed beamformer (first array-processed signal generating section) 200, the blocking matrix circuit (second array-processed signal generating section) 310, the adaptive blocking matrix circuit 300, and the multi-input canceller (correlation elimination section) 500 to thereby enhance and output the target signal or the interferences clearly.

The gain control section 900 further has a function of correcting an estimated value of the target signal power adaptively corresponding to the characteristics of the target signal. As such, it is possible to enhance a specific frequency component adaptively to thereby realize a frequency and directivity with high flatness, thereby the target signal power can be estimated accurately.

The target signal power which is estimated accurately is transmitted to the SIR estimating section 700 to be used for SIR calculation. According to the highly accurate SIR estimated value calculated in this manner, by controlling a parameter which determines the following performance and computation accuracy of adaptive filters such as a coefficient update step size and a forgetting coefficient, coefficient update of the adaptive array processing device can be controlled appropriately.

As a result, a high-quality array processing output which is less influenced by the frequency characteristics of an input signal and directions of the target signal and the interference can be acquired.

[Exemplary Configuration of Gain Control Section 900]

Here, the gain control section 900 will be described in more detail.

Referring to FIG. 2, the gain control section 900 includes a storage section 901, a Fourier transform section 902, an analyzing section 903, a gain calculation section 904, a spectrum correcting section 905, an inverse Fourier transform section 906, and a storage section 907. Referring to FIG. 1, an output of the fixed beamformer 200 is supplied to the storage section 901 of the gain control section 900 and is framed. The framed signal is transmitted to the Fourier transform section 902 and is applied with Fourier transform. The Fourier transform result is supplied to the analyzing section 903 and the spectrum correcting section 905.

The analyzing section 903 analyzes the input signal by using the Fourier transform result, and detects an input signal having a specific characteristic. The information regarding the characteristics of the input signal and the detection result are transmitted to the gain calculation section 904. Although typical information regarding the characteristics of the input signal is spectrum, the amount of characteristic such as cepstrum and information in which cepstrum is thinned out may be used in place of spectrum.

The gain calculation section 904 calculates a correction gain corresponding to the input signal, and supplies it to the spectrum correcting section 905. An example of specific characteristic may be fricative sound. It is known that the frequency spectrum of a fricative sound has a power up to a higher range, and is flat compared with a non-fricative sound.

With these facts, an appropriate correction gain can be obtained according to the power value in a high range and flatness of spectrum. Specifically, a high-range power and spectrum flatness are compared with reference values, and a value according to the magnitude relationship may be set as a correction gain. Further, in a simpler example, if the high range power and spectrum flatness are larger than the predetermined threshold, a correction gain may be set to a value other than 1, and if not, a correction gain may be set to 1. The value of correction gain may be the same or different for respective frequency components.

The spectrum correcting section 905 corrects spectrum by correcting the Fourier transform result supplied from the Fourier transform section 902 by using one or more correction gains supplied from the gain calculation section 904. Specifically, the spectrum correcting section 905 corrects amplitude or power of the Fourier transform result with a correction gain, and supplies the result to the inverse Fourier transform section 906. The phase information is directly supplied to the inverse Fourier transform section 906 without any correction. The inverse Fourier transform section 906 applies inverse Fourier transform to the data supplied from the spectrum correcting section 905, and transmits the result to the storage section 907. The storage section 907 outputs stored data by one sample to thereby apply inverse-frame to the signal sample.

Note that the Fourier transform section 902 and the inverse Fourier transform section 906 may be replaced with another pair of transform (inverse transform processing). Examples of such transform include cosine transform, correction discrete cosine transform also known as MDCT, Hadamard transform, Haar transform, and wavelet transform. Further, prior to such transform processing, or following inverse transform processing, window processing using a window function may be performed so as to improve accuracy of a high-range component, particularly.

[Another Examples of Gain Control Section 900]

FIG. 3 shows another exemplary configuration of the gain control section 900. The gain control section 900 shown in FIG. 3 includes a band division filter bank 911, an analyzing section 912, a gain calculation section 913, a spectrum correcting section 914, and a band synthesis filter bank 915.

An output of the fixed beamformer 200 is supplied to the band division filter bank 911, and is divided into a plurality of frequency bands. Signals of the respective frequency bands are supplied to the analyzing section 912 and the spectrum collecting section. Operation of the analyzing section 912 and the gain calculation section 913 are the same as those of the analyzing section 903 and the gain calculation section 904. The spectrum correcting section 914 uses one or more correction gains supplied from the gain calculation section 913 to correct the level of each frequency band signal, and transmits the result to the band synthesis filter bank 915.

The band synthesis filter bank 915 synthesizes data supplied from the spectrum correcting section 914, converts into a whole band signal, and outputs the result. Different from the exemplary configuration shown in FIG. 2, the present exemplary configuration is capable of performing equivalent processing by sequential processing without accumulating signal samples in the storage circuit. As such, a delay due to a gain control can be reduced, and the following characteristics with respect to the varying system will be increased.

Note that the respective frequency bands of the band division filter bank 911 and the band synthesis filter bank 915 may have equal or unequal intervals. In this case, by dividing the band in unequal intervals, it is possible to lower the time resolution by dividing the bank to have narrow bands in the low frequency and to increase the time resolution by dividing the bank to have wide bands in the high frequency. Typical unequal division includes octave division in which the band becomes a half sequentially toward a lower band, and critical band division corresponding to human audio characteristics. It has been known that unequal division has high consistency with audio signals, particularly.

Note that the detail of the band division filter bank and the band synthesis filter bank and their design method are disclosed in the following document:

"MULTIRATE SYSTEMS AND FILTER BANKS, PRENTICE-HALL, 1993"

Next, the multiple blocking matrix circuit 320 configuring a part of the adaptive mode control unit (adaptive array control device) 1200 will be described in detail.

[Multiple Blocking Matrix Circuit 320: First Example]

First, FIG. 4 shows the case of having the multiple blocking matrix circuit 320, and FIG. 5 shows an exemplary configuration of the multiple blocking matrix circuit 320.

As shown in FIG. 5, the multiple blocking matrix circuit 320 includes subtracters $321_0$ to $321_{M-1}$ and an adder 322. A subtracter i calculates a difference $Z_i(k)=X_0(k)-X_i(k)$ between the first sensor signal $X_0(k)$ and the $i^{th}$ sensor signal $X_i(k)$, and transmits the difference to the adder 322. Here, the symbol i is an integer in a range from 0 to M−2. The adder 322 adds all of the M−1 pieces of input signals, and outputs the addition result as Z(k).

As described in the case of conventional blocking matrix circuit 310 (see FIG. 11), each difference becomes $Z_i(k)=0$ with respect to the target signal coming from the front. $Z_i(k)$ will not be zero with respect to interferences coming from other directions. In other words, all of the differences independently work as blocking matrix, respectively. However, respective differences $Z_i(k)$ have different frequency responses and directivity due to the following two reasons.

First, a relative delay between two sensor signals, which are subtracter inputs, is given in the form that a product of a distance between sensors and sin in a signal incoming direction is divided by sound velocity. Further, a distance between sensors differs in all $Z_i(k)$. The frequency characteristics and the directivity of the difference $Z_i(k)$ becomes a function of the distance between sensors. In turn, the differences $Z_i(k)$, in which distances between sensors are different, have different frequency characteristics and directivity. This is also correct when the subtracters $321_0$ to $321_{M-1}$ are replaced with adders. However, an aspect that the gain becomes an inverse number of the case of subtracters is different. In the case of using adders, a target signal is enhanced. The frequency characteristics and directivity in that case are disclosed in the following document:

"MICROPHONE ARRAYS, CH. 1, FIG. 1.1, SPRINGER-VERLAG, BERLIN, 2001"

In the case of subtracters, it is only necessary to normalize the inverse numbers of the frequency characteristics and the directivity in the above-mentioned document. In this document, if a distance between sensors is constant, it is found that as an input signal frequency becomes higher, the directivity become precipitous. In a lower frequency, the beam angle is wide, and the directivity deteriorate.

By applying this feature to the case of the subtracters $321_0$ to $321_{M-1}$, in a low frequency, the sensitivity is low with respect to a target signal coming from the front, and the sensitivity is high with respect to directions other than the front. However, as transition from a direction of low sensitivity to a direction of high sensitivity is slow, sufficient directivity cannot be obtained. In contrast, if the sensor interval becomes wider, the relative delay becomes larger, so that high directivity can be realized. In other words, precipitous directivity can be achieved.

According to this principle, in the first exemplary embodiment, a plurality of differences between signals obtained from pairs of sensors of different intervals are calculated, and by adding them, a blocking matrix having excellent directivity comprehensively is obtained. The plurality of differences are calculated by the subtracters $321_0$ to $321_{M-1}$, and are added together by the adder 322.

With this configuration, as differences between signal pairs obtained from sensors arranged at wide intervals act effectively on low-frequency signals, and differences between signal pairs obtained from sensors arranged at narrow intervals act effectively on high-frequency signals, excellent directivity can be realized with respect to wideband signals. As such, the multiple blocking matrix circuit 320 can suppress a target signal with excellent frequency characteristics and the directivity.

The first exemplary embodiment is configured such that interference power is accurately estimated using an output of the multiple blocking matrix circuit 320 having such characteristics, and using the result, SIR is calculated by the SIR calculation section 700. As such, by controlling parameters determining the following property and operational accuracy of adaptive filters such as a coefficient update step size and a forgetting coefficient based on an accurate estimated SIR value, coefficient update in the adaptive blocking matrix circuit 300 of the adaptive array processing device and in the multipole input canceller 500 which outputs a target signal can be controlled properly. As a result, it becomes possible to obtain a high-quality array processing output which is less influenced by the frequency characteristics of an input signal and directions of a target signal and interferences.

[Another Exemplary Configuration of Blocking Matrix Circuit 320: Second Example]

FIG. 6 shows another exemplary configuration of the blocking matrix circuit 320.

The blocking matrix circuit 320 shown in FIG. 6 includes subtracters $321_0$ to $321_{M-1}$, filters $323_0$ to $323_{M-1}$, and an adder 322. A subtracter i calculates a difference $Z_i(k)=X_0(k)-X_i(k)$ between the first sensor signal $X_0(k)$ and the $i^{th}$ sensor signal $X_i(k)$, and transmits the difference to the filter $323_i$. A signal i is an integer in the range from 0 to M−2.

The filter $323_i$ transmits a signal component of a pass band to the adder 322. The adder 322 add all of the M−1 pieces of input signals, and output the addition result as Z(k). The pass band of the filter $323_i$ is determined by the microphone interval between the $0^{th}$ and the $i^{th}$. The filter $323_i$ is designed such that the frequencies in which the directivity determined by the $0^{th}$ and the $i^{th}$ microphone signals, particularly, attenuation characteristics with respect to directions other than the front, become flat with respect to the directions, becomes a pass band.

[Third Example of Blocking Matrix Circuit 320]

The blocking matrix circuit 320 may have another configuration (see FIG. 7). In a series array configured of M pieces of sensors, an interval between two sensors is set to be D, 2D, 3D, - - - or (M−1)D, from the shortest. There are M−1 pairs of sensors in which the sensor interval is D, and M−2 pairs of sensors in which the sensor interval is 2D, and similarly, there are one pair in which the sensor interval is (M−1)D. Accordingly, the blocking matrix circuit 320 exhibits the above-described effects as long as it has a configuration such that a pair of sensors corresponding to each sensor interval is set, differences between signals obtained therefrom are calculated, and the differences are added by the adder 322. An example of such a configuration is shown in FIG. 7.

In FIG. 7, operation of the subtracters $321_0$ and $321_{M-2}$ is different from that shown in FIG. 3.

Although, in FIG. 6, those subtracters output differential signals corresponding to sensor intervals D and (M−1)D, in FIG. 7, they output differential signals corresponding to sensor intervals (M−1)D and D. Besides, various similar configurations can be adopted.

[Fourth Example of Blocking Matrix Circuit 320]

Even in the case of a configuration not using signals corresponding to specific sensor intervals among these configurations, a blocking effect of a target signal is higher than that of the conventional blocking matrix circuit 310. FIG. 8 shows an exemplary configuration (fourth example) of such a blocking matrix circuit 320. Compared with FIG. 6, FIG. 8 does not include the subtracter $321_2$. As such, as there is no differential signal corresponding to a sensor interval 2D, no effect caused by the sensor interval 2D is expectable. However, with signals corresponding to other sensor intervals, it is possible to obtain the blocking matrix circuit 320 having comprehensively-excellent directivity, although it is less than the example of FIG. 6.

Although, in the third and fourth examples (FIGS. 7 and 8) of the blocking matrix circuit 320, outputs of the subtracters $321_0$ to $321_{M-1}$ are supplied to the adder 322 via the filters $323_0$ to $323_{M-1}$, a configuration without the filters $323_0$ to $323_{M-1}$ is also possible which is the same as the case of FIG. 5. In FIGS. 7 and 8, those configurations can be achieved by directly connecting all inputs and outputs of the filters $323_0$ to $323_{M-1}$.

Other basic configurations and their operational effects are the same as those of the conventional case and the like in FIG. 11.

As the blocking matrix circuit 320 can be configured with output contents being varied according to the purposes, by appropriately selecting and providing it, high-quality array processing outputs which are less influenced by the frequency characteristics of input signals and directions of a target signal and interferences can be obtained.

[Description of Overall Operation]

Next, overall operation of the first exemplary embodiment will be described based on FIG. 9.

First, when a plurality of signals captured by a group of sensors arranged in an array are transmitted, the receiving section 100 receives and temporarily stores them (step S101). The receiving section 100 has a function capable of regularly receiving a plurality of signals from the group of sensors arranged in an array. The signals from the sensors in an array received by the receiving section 100 are transmitted to the fixed beamformer (first array-processed signal generating section) 200, the blocking matrix circuit (second array-processed signal generating section) 310 (320), and the adaptive blocking matrix circuit (interference extraction section) 300, simultaneously.

In the fixed beamformer 200, a target signal included in the transmitted plurality of signals is processed to be enhanced with respect to the other signals, whereby a first array-processed signal is generated (step S102: first array-processed signal generation step).

At the same time, in the blocking matrix circuit (second array-processed signal generating section) 310 (320), the target signal included in the transmitted plurality of signals is attenuated with respect to the other signals, so that the interferences are processed to be enhanced, whereby a second array-processed signal is generated (step S103: second array-processed signal generation step). The second array-processed signal is temporarily stored in the blocking matrix circuit 310 (320).

Further, in the adaptive blocking matrix circuit 300, the target signal included in the transmitted plurality of signals is attenuated with respect to the other signals so that the interferences are enhanced, whereby a third array-processed signal is generated, which is output to the multi-input canceller 500 (step S104).

The respective processing operations of the fixed beamformer 200, the blocking matrix circuit 310, and the adaptive blocking matrix circuit 300 are simultaneously activated in parallel and are simultaneously executed.

The first array-processed signal, which is generated in the step S102 by enhancing the target signal, is transmitted to the delay element 400, and is transmitted to the multi-input canceller 500 at a predetermined delayed timing (step S105). At the same time, the first array-processed signal is transmitted to the gain control section 900. In the gain control section 900, the first array-processed signal is immediately analyzed, and signal characteristics are acquired (step S106: signal characteristic analyzing step). Then, in the gain control section 900, the first array-processed signal is corrected to a signal for SIR estimation corresponding to the generated signal characteristics, whereby a first corrected array-processed signal is generated (step S107: first array-processed signal correcting step).

Then, based on the first corrected array-processed signal and the second array-processed signal generated by the blocking matrix circuit 320, the ratio of the target signal to the interferences (SIR) is calculated and estimated by the SIR estimating section 700 (step S108: SIR estimation step). In this case, estimation of SIR may be performed by using a predetermined interference (e.g., one estimated beforehand) instead of the second array-processed signal. In that case, in place of the SIR estimation step, a magnitude relationship specifying step to calculate a relative magnitude relationship between the first corrected array-processed signal and the second array-processed signal may be set. In this case, it is also acceptable to form a third array-processed signal, which functions in the same manner as the second array-processed signal, by the blocking matrix circuit 320, and to use the signal in the magnitude relationship specifying step instead of the second array-processed signal.

Then, the estimated SIR value (or the magnitude relationship specifying value) estimated in the SIR estimation step is immediately transmitted to the arithmetic control section 800. The arithmetic control section 800 generates a control signal, which functions based on the estimated SIR value (or magnitude relationship specifying value), for setting and controlling a parameter which determines the following speed and the computation accuracy to be in the optimum state in the adaptive array processing of the first array-processed signal in the multi-input canceller 500 (step S109: control signal generation step). In the multi-input canceller 500 to which the control signal is input, setting control is performed to enhance and output the target signal (adaptive array processing control step).

In other words, when performing adaptive array processing of the first array-processed signal by the arithmetic control section 800, a coefficient update control of the processing device can be performed properly, and a high-quality array processing output which is less influenced by the frequency characteristics of the input signals and the directions of the target signal and the interference can be obtained (step S110).

Here, it is also acceptable that the arithmetic control section 800 transmits the control signals to the fixed beamformer 200 and the blocking matrix circuit 320, and controls outputting of the signals or controls enhancing and outputting of at least one of the signals.

As described above, according to the first exemplary embodiment, as each of the power estimation values of the target signal (or target signal and interferences) is corrected adaptively according to the characteristics of the target signal, it is possible to realize a frequency and directivity with high flatness to thereby accurately estimate each power of the target signal (or target signal and distributing signals). Thereby, it is possible to properly perform a coefficient update control of the processing device, so that a high-quality array processing output which is less influenced by the frequency characteristics of the input signals and the directions of the target signal and interferences can be obtained.

Second Exemplary Embodiment

A second exemplary embodiment of the invention will be described according to FIG. 10.

In this exemplary embodiment, components which function in the same manner as those of the first exemplary embodiment are denoted by the same reference numerals.

The second exemplary embodiment shown in FIG. 10 includes a computer (CPU; processor; processing device main body) 1000 which operates in accordance with a program control, input terminals $101_0$ to $101_{M-1}$, and an output terminal 600.

The computer (CPU; processor; processing device main body) 1000 includes a storage device storing processing programs which function in the same manner as respective functions of the fixed beamformer 200, the adaptive blocking matrix circuit 300, the delay element 400, the multi-input canceller 500, the blocking matrix circuit 310 (320), the SIR estimating section 700, and the arithmetic control section having a comparing function as well, disclosed in the first exemplary embodiment, and a central processing unit which executes the processing programs. Further, the processing programs may include the configuration content of the gain control section 900 disclosed in the second exemplary embodiment.

The target signal and the interferences supplied to the input terminals $101_0$ to $101_{M-1}$ are supplied to the array processing device 1100 assumed in the processing program within the computer 1000 where the interferences are suppression-processed.

The assumed array processing device 1100 includes, as components, executing contents which are the same as the fixed beamformer 200, the adaptive blocking matrix circuit 300, the delay element 400, and the multi-input canceller 500. Further, in the present exemplary embodiment, the adaptive blocking matrix circuit 300 and the multi-input canceller 500 are provided together with an adaptive mode control unit (adaptive array control device) 1200 which controls operations of the adaptive blocking matrix circuit 300 and the multi-input canceller 500.

The adaptive mode control unit 1200 is configured of processing programs including execution contents which are the same as the blocking matrix circuit 320, the SIR estimating section 700, and the arithmetic control section 800 also working as a comparing section, in the second exemplary embodiment.

The adaptive mode control unit 1200 controls the coefficient updating speed and the accuracy of the adaptive filters included in the adaptive blocking matrix circuit 300 and the multi-input canceller 500 of the array processing device. The adaptive mode control unit 1200 may further include a processing program which works as same as the gain control section 900.

The adaptive mode control unit 1200 has a function of setting a plurality of pairs of sensors having different sensor intervals based on a plurality of pieces of array sensor information input, and estimating interference power using each of the pairs of sensors, same as the adaptive mode control unit of each of the exemplary embodiments. As such, with the adaptive mode control unit 1200, it is possible to realize characteristics of high flatness in which different frequency characteristics and directivity are combined, whereby the interference power can be estimated accurately.

Further, as the estimation value of the target signal power is corrected adaptively corresponding to the characteristics of the target signal, it is possible to adaptively enhance a specific frequency component to thereby realize spatio-frequency selectivity with high flatness to thereby accurately estimate the target signal power.

As described above, as the adaptive array processing device 1100 of the exemplary embodiment has the adaptive mode control unit 1200, it is possible to properly perform a coefficient update control of the adaptive blocking matrix circuit 300 and the multi-input canceller 500 in the same manner as the case of the respective exemplary embodiments, whereby a high-quality array processing output which is less influenced by the frequency characteristics of the input signals and the directions of the target signal and the interference can be obtained.

Although description has been given above using microphones as sensors, sensors such as ultrasonic sensors, sonar receivers, and antennas may be used instead of microphones.

As described above, according to the exemplary embodiment, the interference power, the target signal power, and the ratio between the target signal and the interference (SIR) can be estimated accurately. As such, it is possible to properly perform coefficient update control, which is less influenced by the frequency characteristics of the input signals and the directions of the target signal and the interferences. Consequently, deterioration of signals and breathing noises in outputs of the array processing device can be reduced effectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

DESCRIPTION OF REFERENCE NUMERALS

Figure 1:
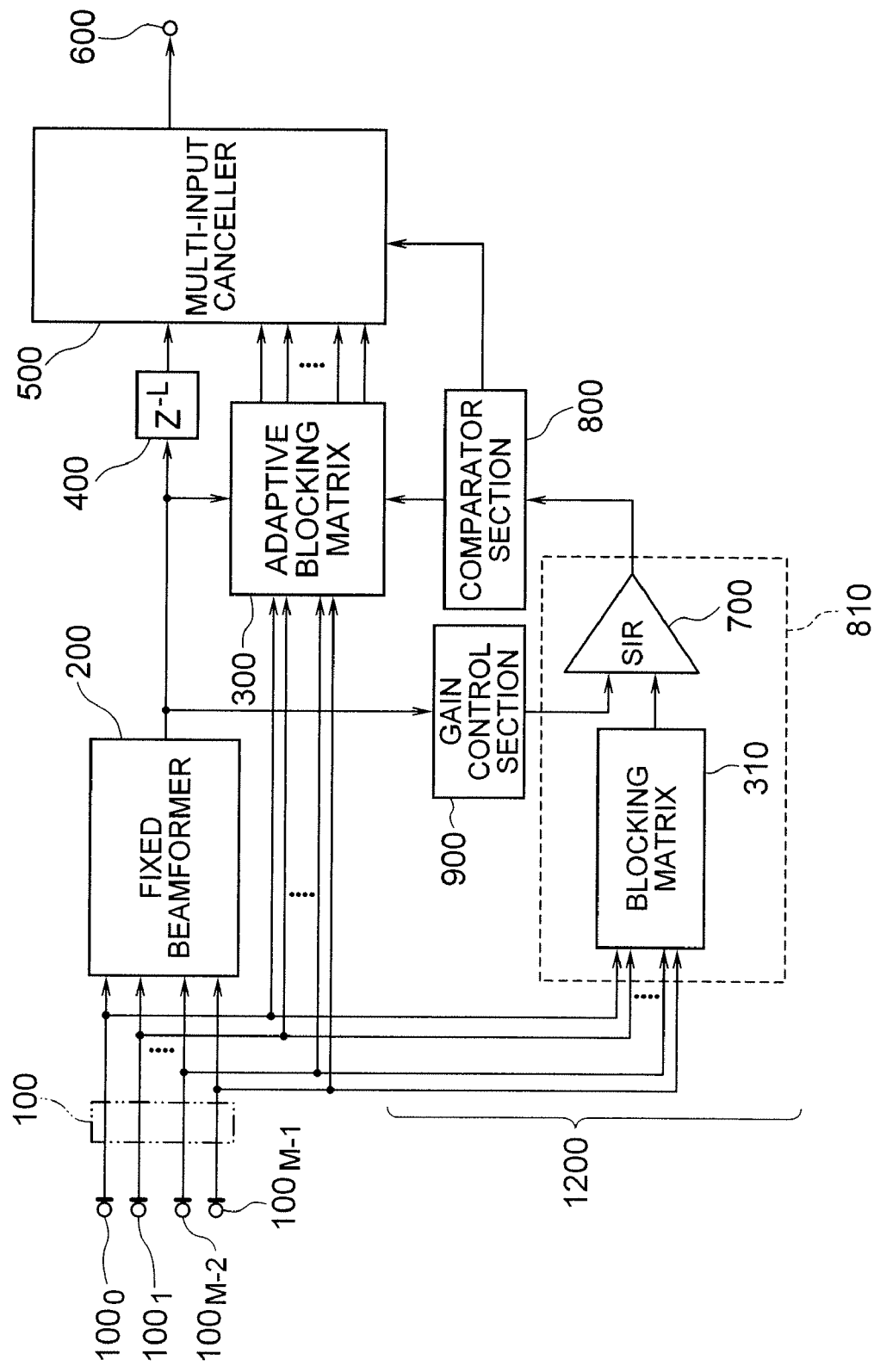
FIG. 1 is a block diagram showing the first exemplary embodiment of the invention.
Figure 2:
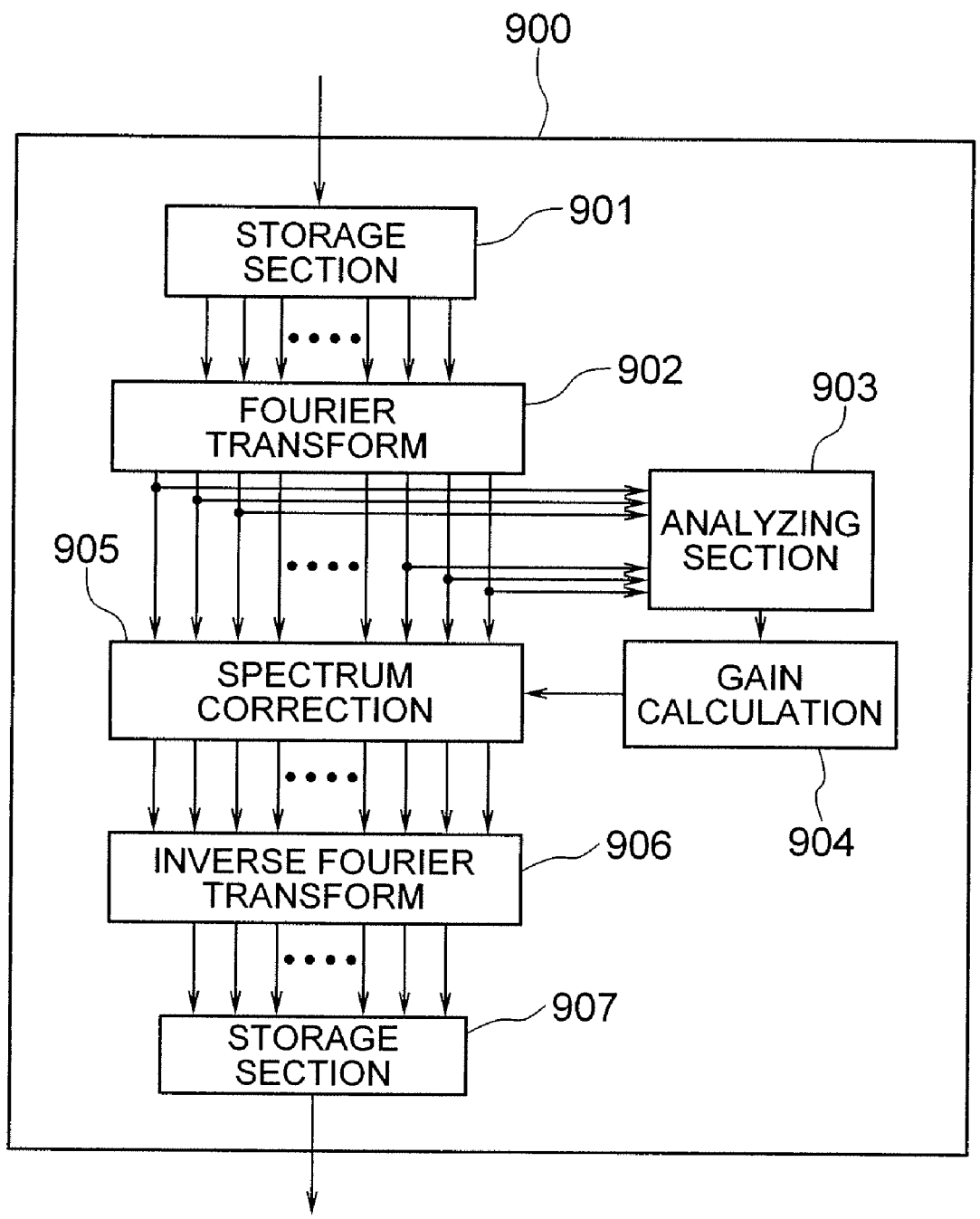
FIG. 2 is a block diagram showing the first example of the gain control circuit disclosed in FIG. 1.
Figure 3:
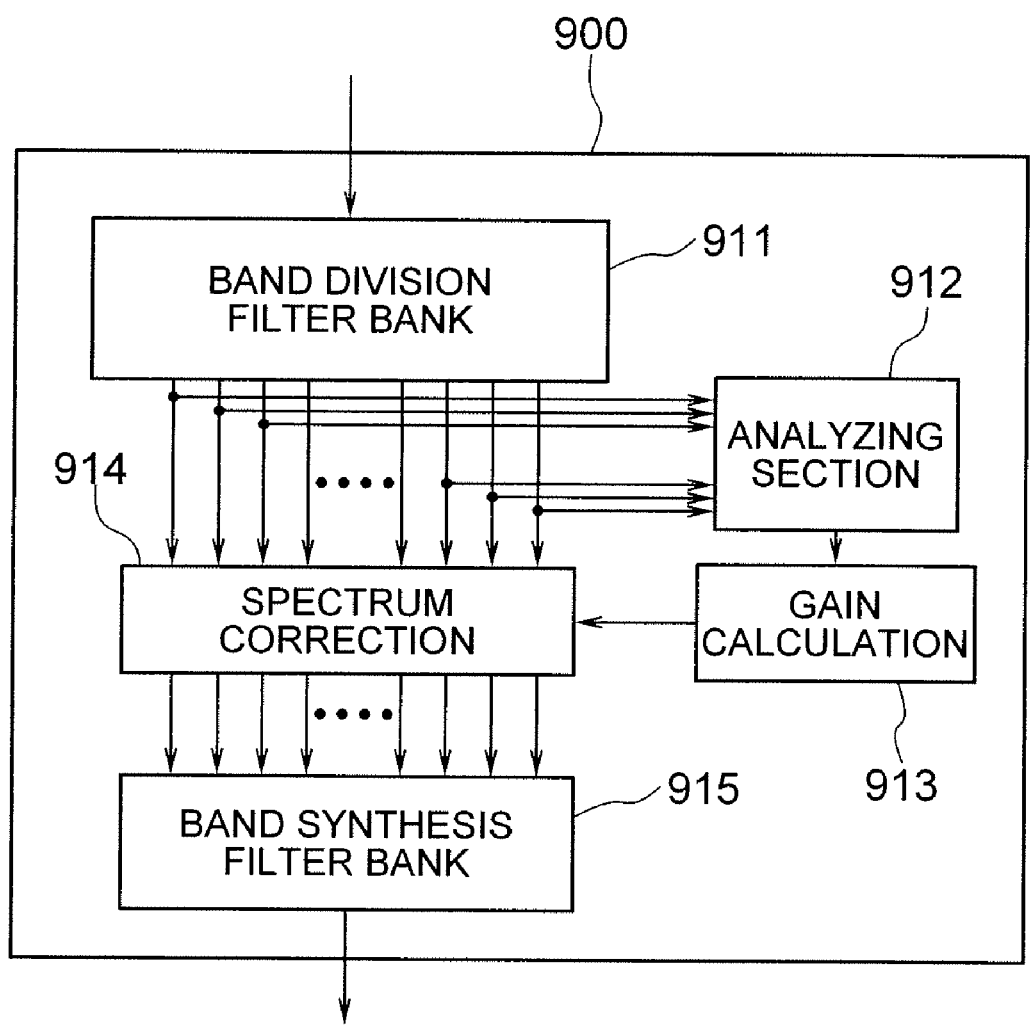
FIG. 3 is a block diagram showing the second example of the gain control circuit disclosed in FIG. 1.
Figure 4:
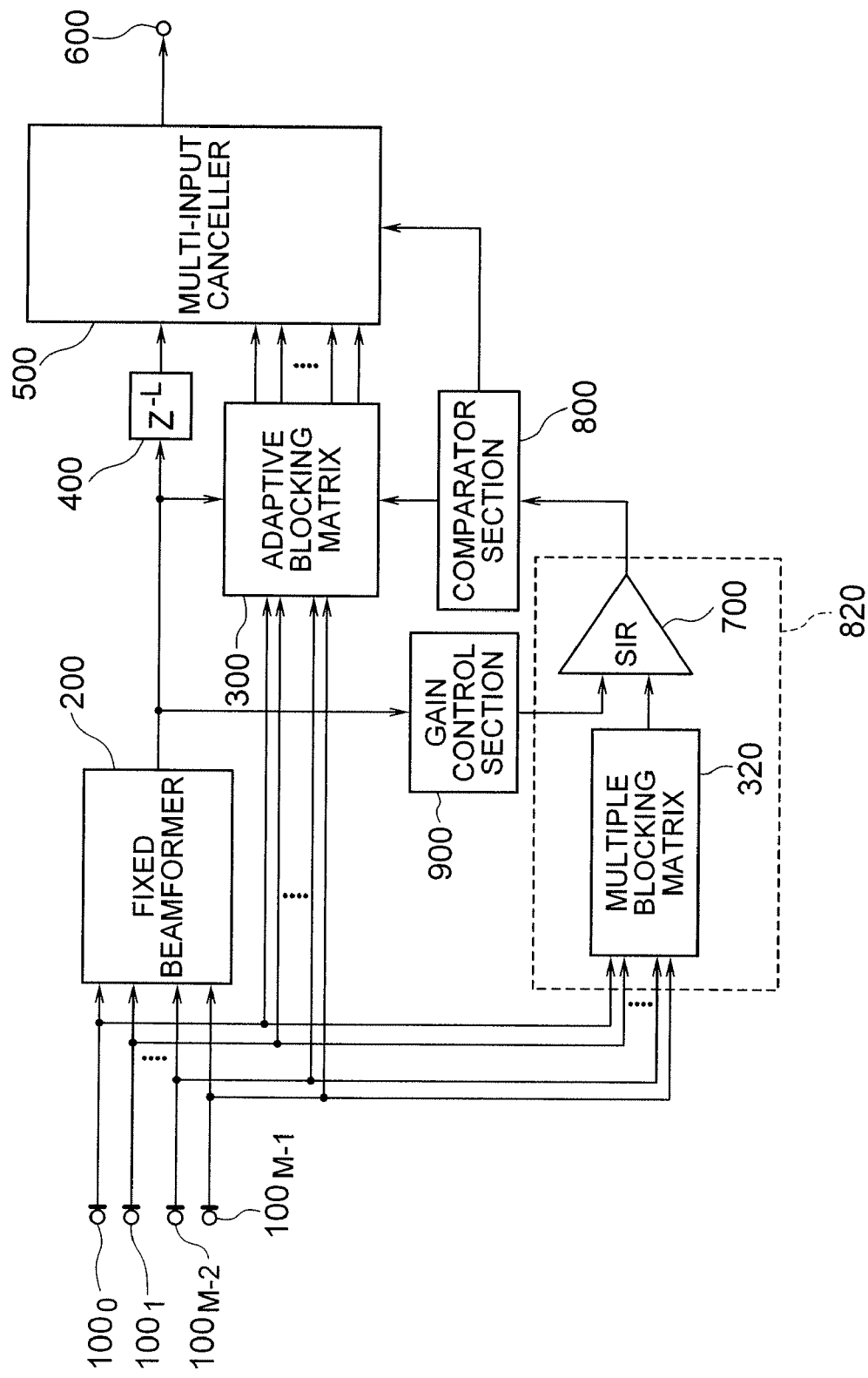
FIG. 4 is a block diagram showing another example (multiple blocking matrix circuit) of the blocking matrix circuit disclosed in FIG. 1.
Figure 5:
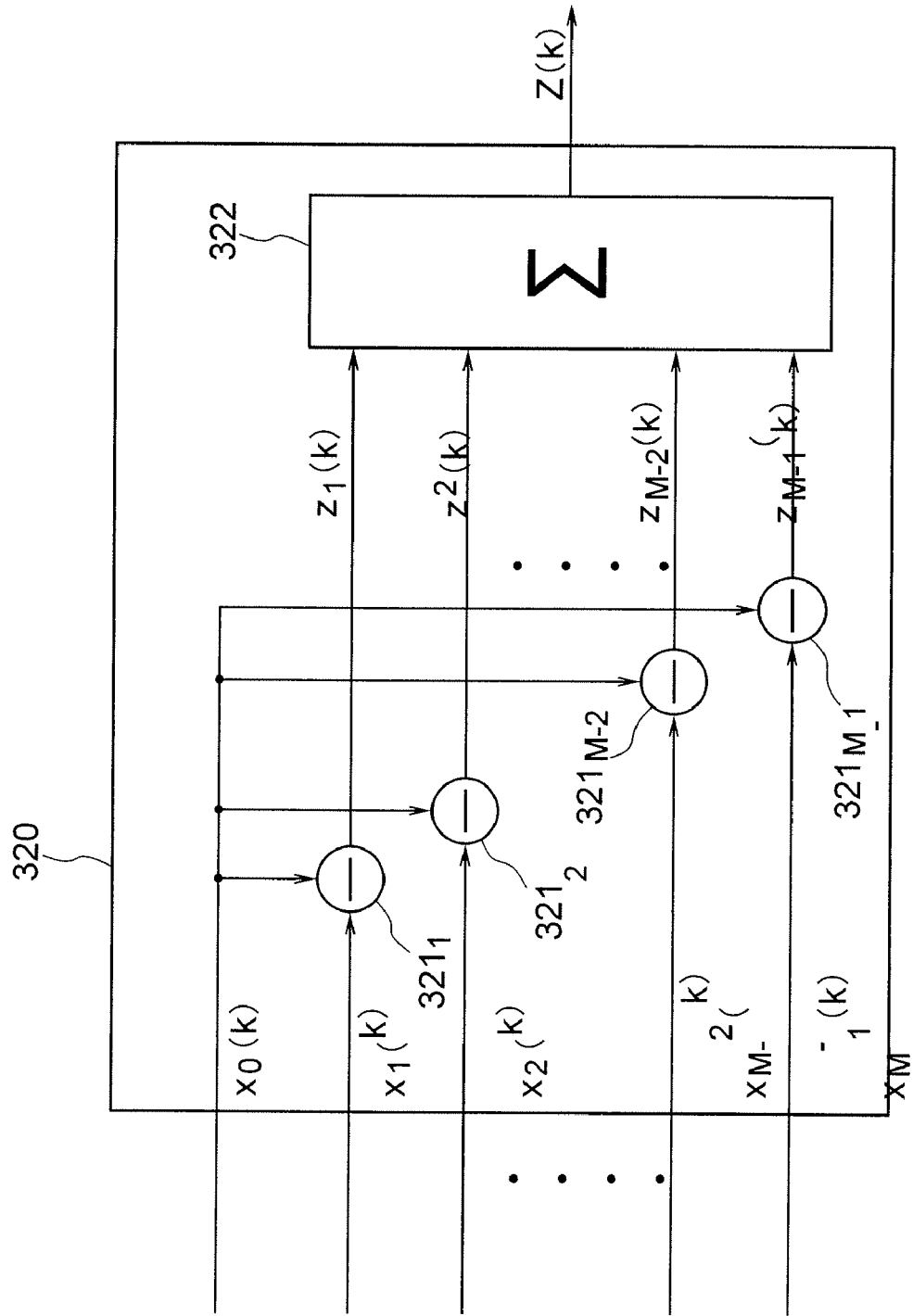
FIG. 5 is a block diagram showing the first specific example of the multiple blocking matrix circuit disclosed in FIG. 4.
Figure 6:
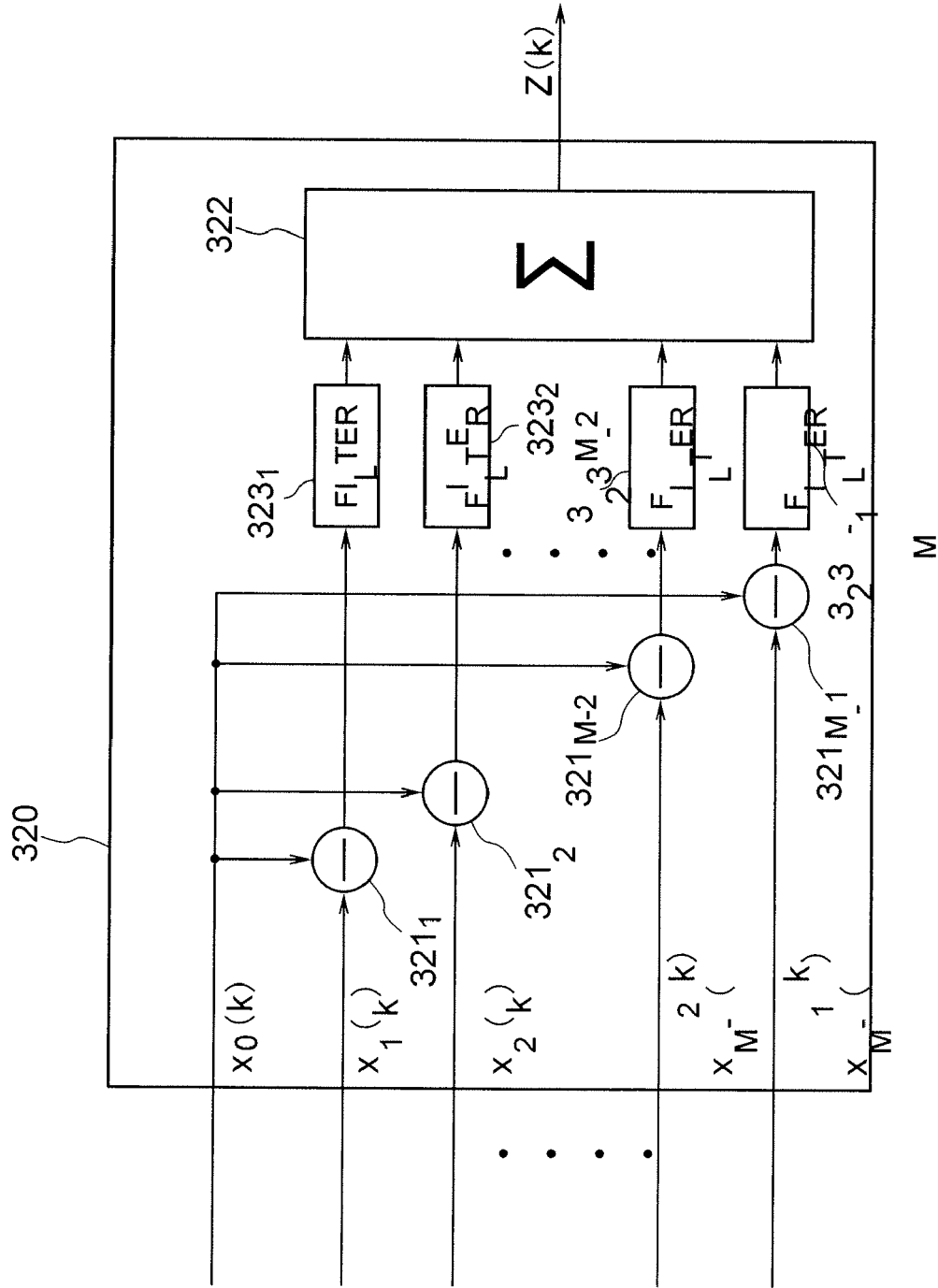
FIG. 6 is a block diagram showing the second specific example of the multiple blocking matrix circuit disclosed in FIG. 4.
Figure 7:
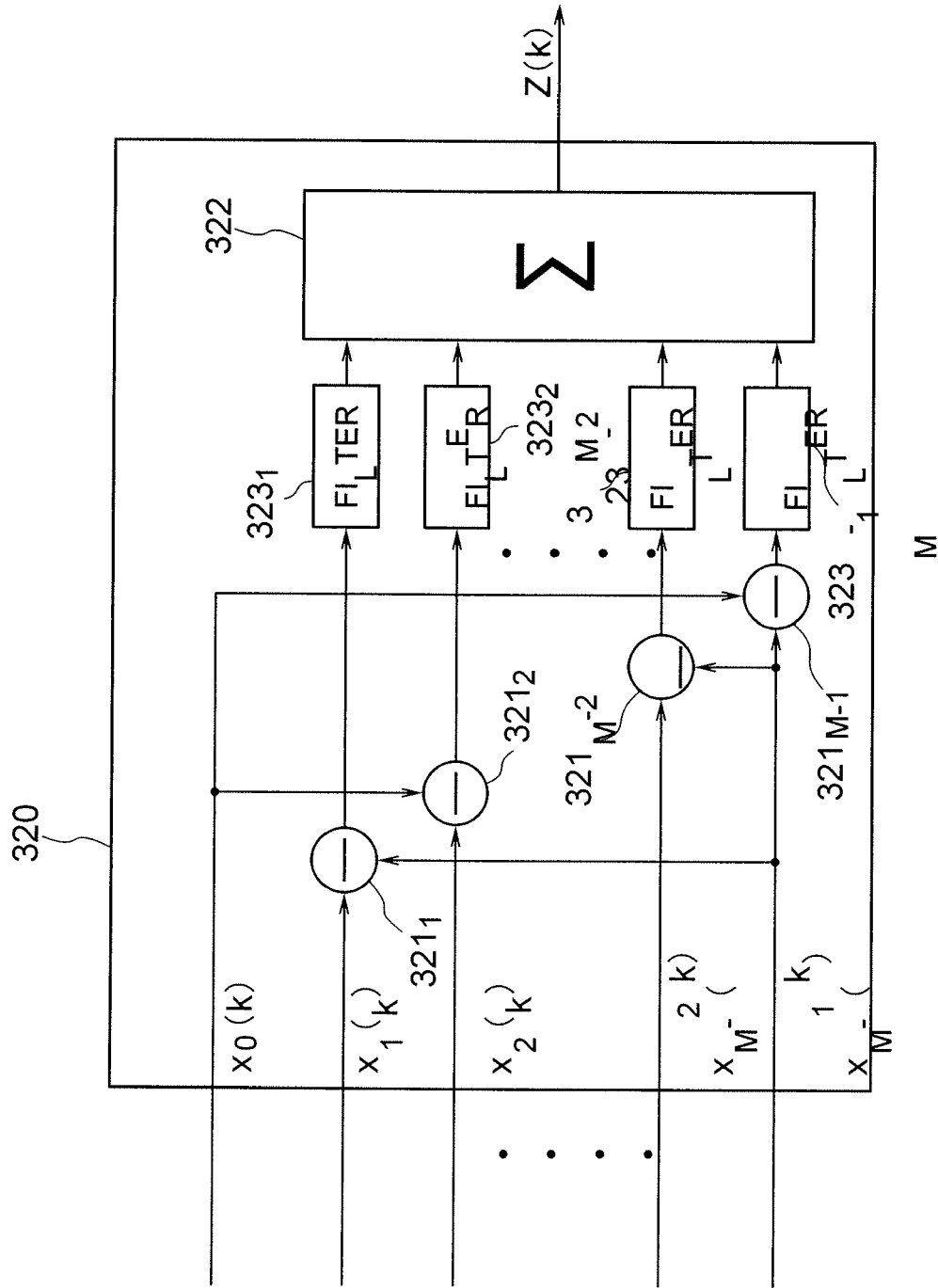
FIG. 7 is a block diagram showing the third specific example of the multiple blocking matrix circuit disclosed in FIG. 4.
Figure 8:
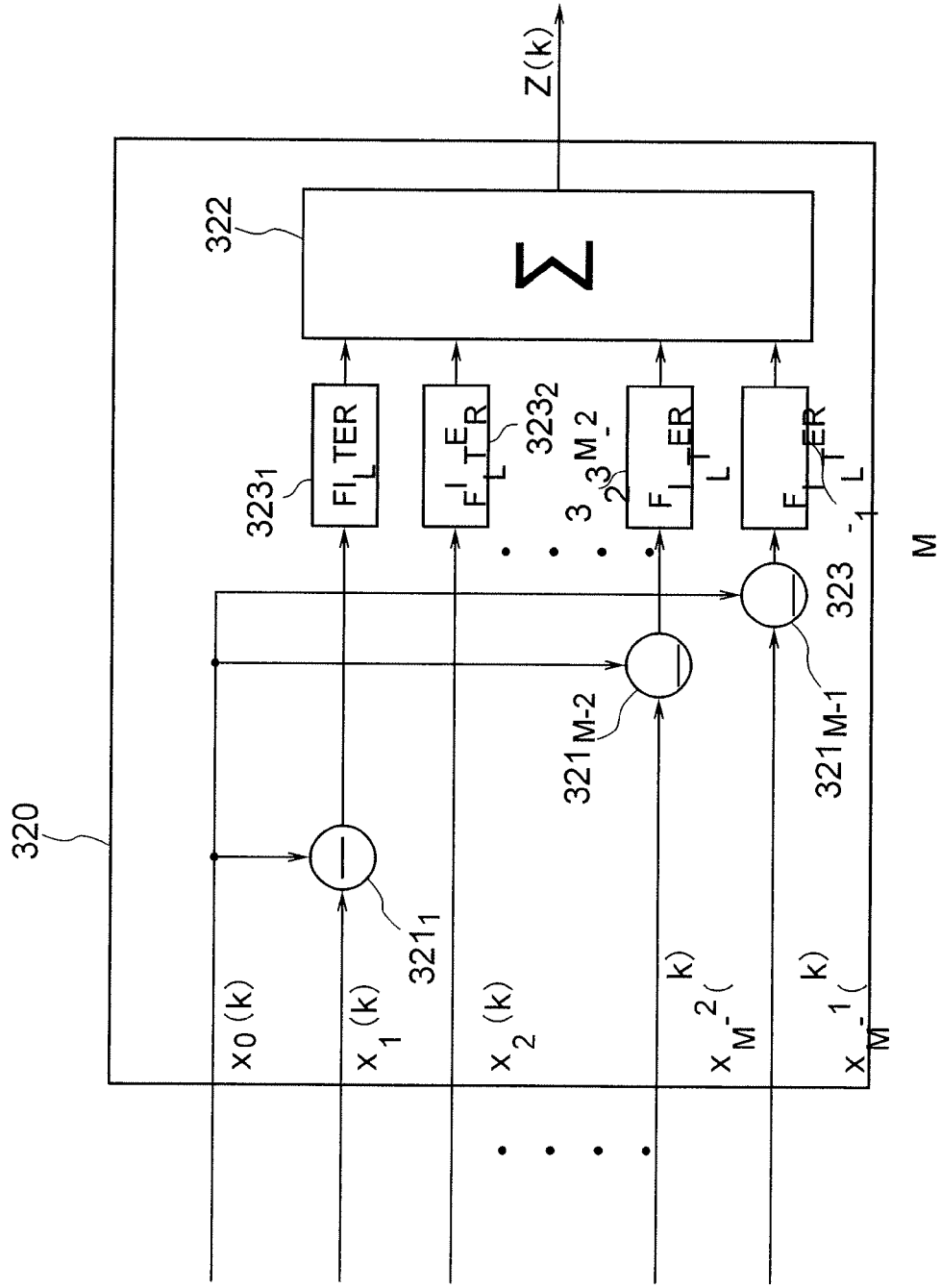
FIG. 8 is a block diagram showing the fourth specific example of the multiple blocking matrix circuit disclosed in FIG. 4.
Figure 9:
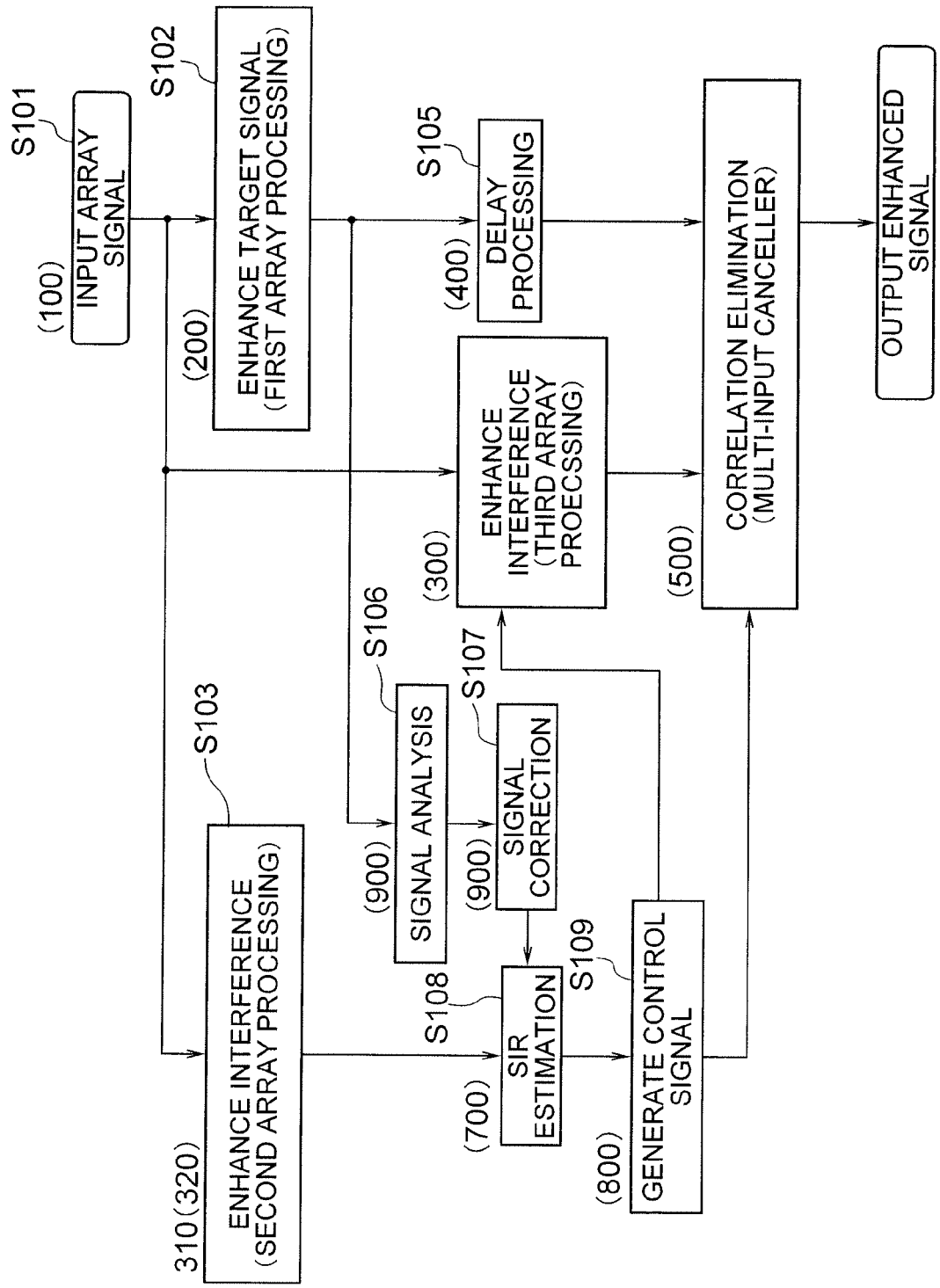
FIG. 9 is a flowchart showing operation of the first exemplary embodiment disclosed in FIG. 1.
Figure 10:
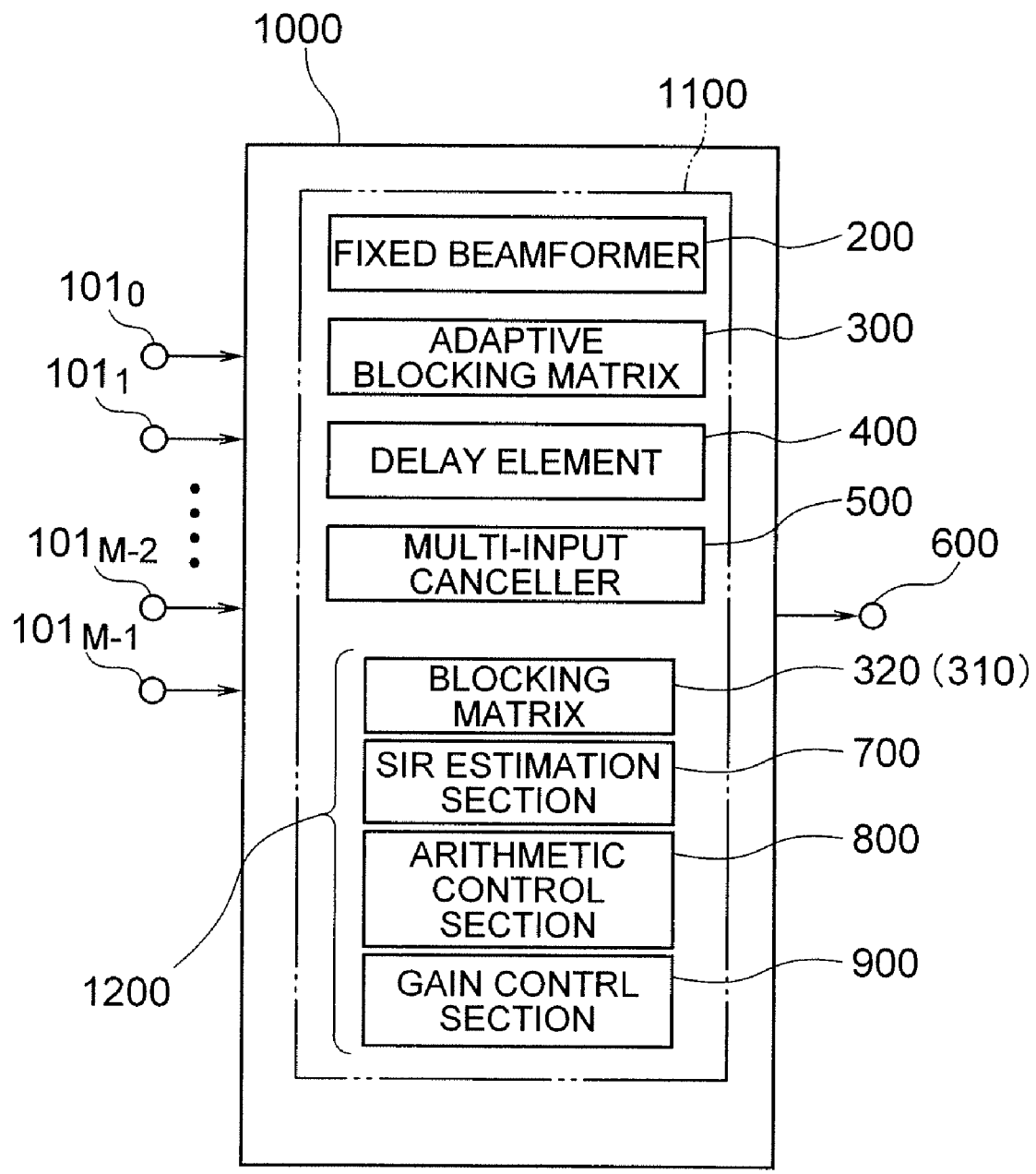
FIG. 10 is a block diagram showing the second exemplary embodiment of the invention.
Figure 11:
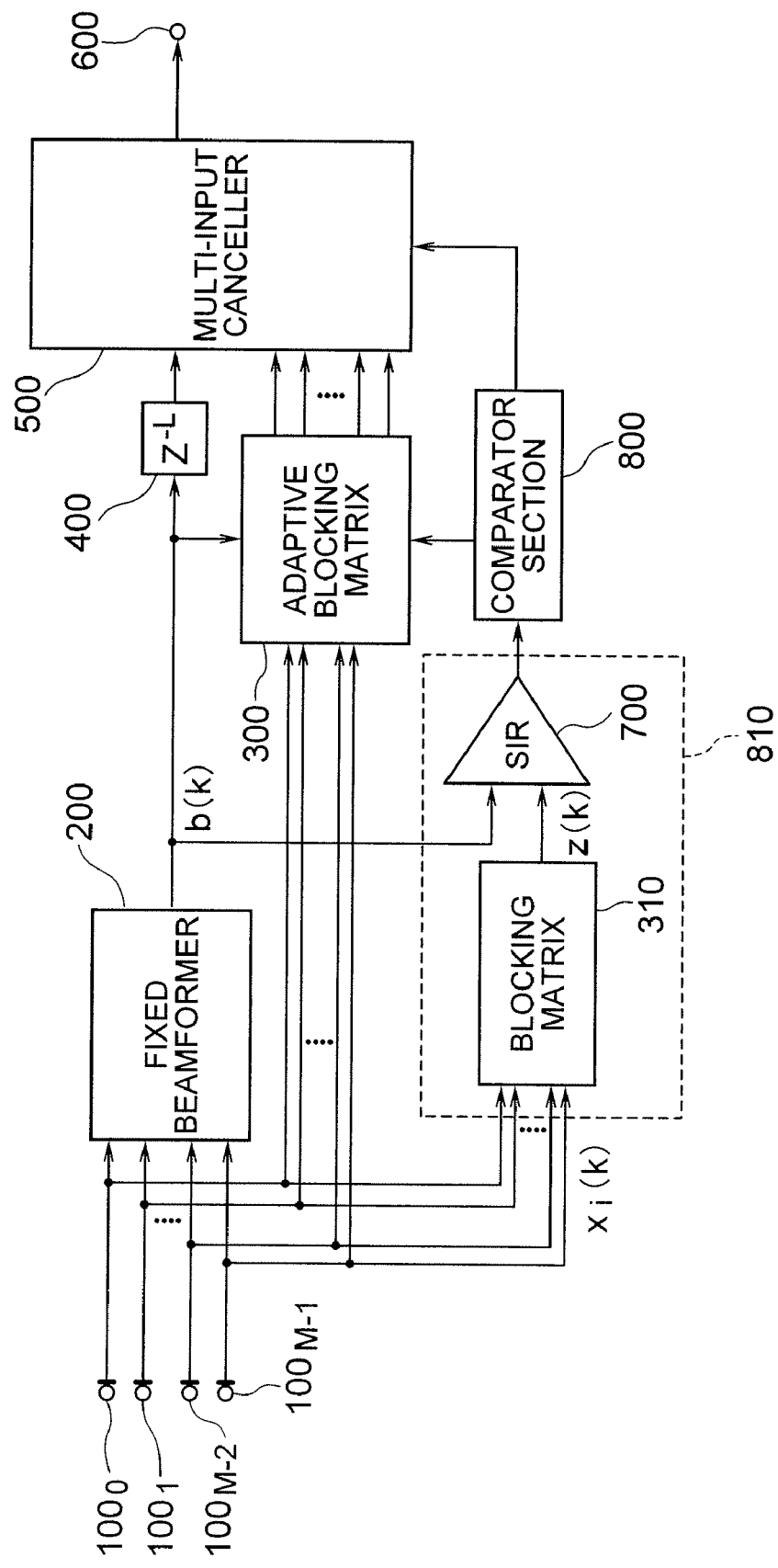
FIG. 11 is a block diagram showing the conventional example.
Figure 12:
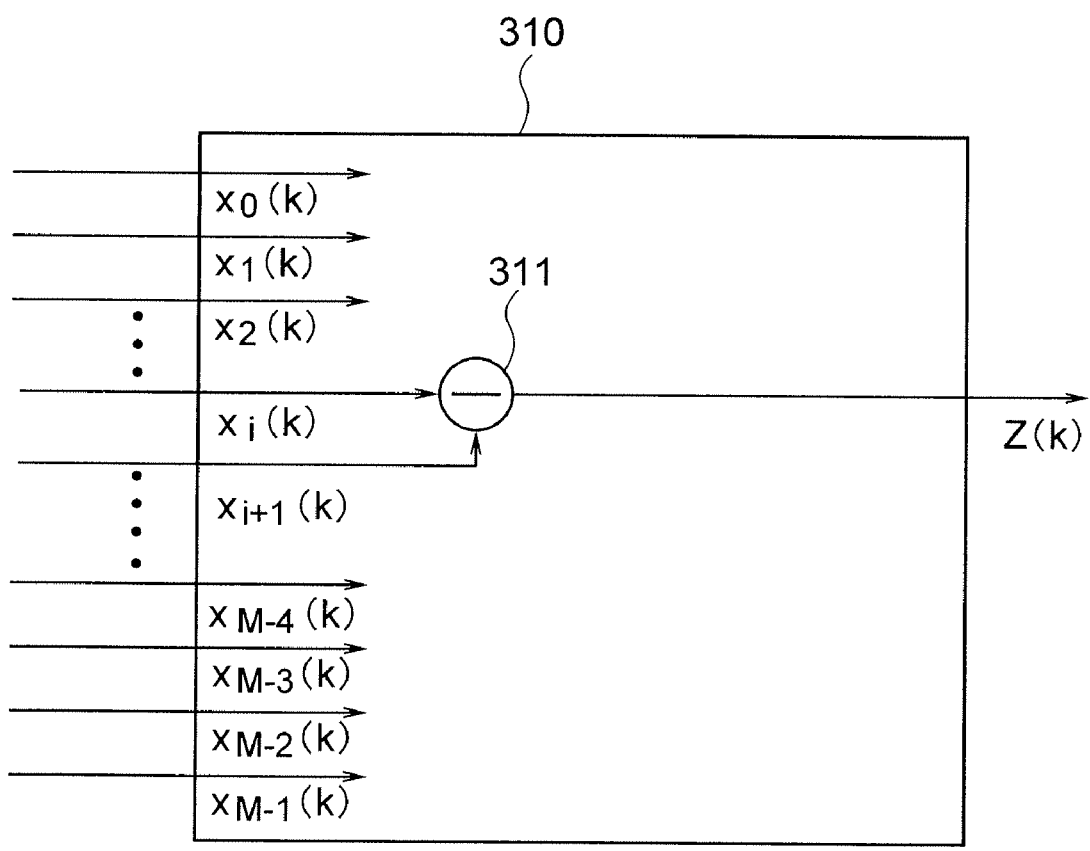
FIG. 12 is a configuration diagram showing the blocking matrix circuit disclosed in FIG. 11.

100 receiving section
100$_0$~100$_{M-1}$ a plurality of microphones as array sensors
200 fixed beamformer (first array-processed signal generating section)
300 adaptive blocking matrix circuit (second array-processed signal generating section)
310, 320 blocking matrix circuit (first array-processed signal generating section)
311, 321$_0$-321$_{M-1}$ subtracter
322 adder
323$_0$~323$_{M-1}$ filter
400 delay element
500 multi-input canceller (adaptive array processing section)
600 output terminal
700 calculation section for target signal to interference ratio (SIR calculation section, SIR estimating section)
800 arithmetic control section
900 gain control section
901, 907 storage section
903, 912 analyzing section
904, 913 gain calculation section
905, 914 spectrum correcting section (correcting section)
1000 computer
1200 adaptive mode control unit (adaptive array control device)

The invention claimed is:

1. An adaptive array control device comprising:
an analyzing section for analyzing amplitude information of a first array-processed signal formed by enhancing a target signal, included in a plurality of signals transmitted from a plurality of sensors arranged in an array, with respect to other signals, and acquiring a signal characteristic;
a correcting section for correcting the first array-processed signal corresponding to the acquired signal characteristic to thereby output as a first corrected array-processed signal;
an SIR estimating section for estimating a ratio of interference to the target signal (SIR) according to the first corrected array-processed signal; and
an arithmetic control section for generating a control signal for controlling speed and accuracy of parameter adjustment in a predetermined adaptive array processing section using an estimated SIR value.

2. The adaptive array control device, according to claim 1, further comprising:
a second array-processed signal generating section which generates a signal acquired by an array of equispaced sensors for attenuating the target signal with respect to the other signals to thereby generate a second array-processed signal, wherein
the SIR estimating section is configured to estimate and specify the ratio of the target signal to the interference (SIR) according to the second array-processed signal generated by the second array-processed signal generating section and the first corrected array-processed signal, and
the arithmetic control section has an adaptive array processing control function to control, using the estimated SIR value, the speed and the accuracy of the parameter adjustment required for adaptive array processing performed by the predetermined adaptive array processing section.

3. An adaptive array control device comprising:
analyzing means for analyzing amplitude information of a first array-processed signal formed by enhancing a target signal, included in a plurality of signals transmitted from a plurality of sensors arranged in an array, with respect to other signals, and acquiring a signal characteristic;

correcting means for correcting the first array-processed signal corresponding to the acquired signal characteristic to thereby output as a first corrected array-processed signal;

SIR estimating means for estimating a ratio of interference to the target signal (SIR) according to the first corrected array-processed signal; and arithmetic control means for generating a control signal for controlling speed and accuracy of parameter adjustment in a predetermined adaptive array processing section using an estimated SIR value.

4. An adaptive array control device comprising:

an analyzing section for analyzing a first array-processed signal formed by enhancing a target signal, included in a plurality of signals transmitted from a plurality of sensors arranged in an array, with respect to other signals, and acquiring a signal characteristic;

a correcting section for correcting the first array-processed signal corresponding to the acquired signal characteristic to thereby output as a first corrected array-processed signal;

a second array-processed signal generating section for attenuating the target signal with respect to the other signals to thereby generate a second array-processed signal;

a calculation section for calculating a relative magnitude relationship between the first corrected array-processed signal and the second array-processed signal; and an arithmetic control section for generating a control signal for controlling speed and accuracy of parameter adjustment in a predetermined adaptive array processing section using the magnitude relationship calculated by the calculation section.

5. The adaptive array control device, according to claim 4, wherein the second array-processed signal generating section has a sensor pair difference information outputting function to set a plurality of pairs of sensors having different sensor intervals based on a plurality of pieces of array sensor information input, and calculate and output an output difference between each of the pairs of sensors.

6. The adaptive array control device, according to claim 5, wherein the second array-processed signal generating section includes a plurality of filters for filtering respective output differences and an adder which adds filter outputs, and has an addition result outputting function to externally output an addition result of the adder.

7. An adaptive array control device comprising:

analyzing means for analyzing a first array-processed signal formed by enhancing a target signal, included in a plurality of signals transmitted from a plurality of sensors arranged in an array, with respect to other signals, and acquiring a signal characteristic;

correcting means for correcting the first array-processed signal corresponding to the acquired signal characteristic to thereby output as a first corrected array-processed signal;

second array-processed signal generating means for attenuating the target signal with respect to the other signals to thereby generate a second array-processed signal;

calculation means for calculating a relative magnitude relationship between the first corrected array-processed signal and the second array-processed signal; and arithmetic control means for generating a control signal for controlling speed and accuracy of parameter adjustment in a predetermined adaptive array processing section using the magnitude relationship calculated by the calculation section.

8. An adaptive array controlling method comprising:

analyzing amplitude information of a first array-processed signal generated by enhancing a target signal, included in a plurality of signals transmitted from a plurality of sensors arranged in an array, with respect to other signals, and acquiring a signal characteristic thereof;

correcting the first array-processed signal corresponding to the acquired signal characteristic and outputting as a first corrected array-processed signal;

estimating a ratio of the target signal to interference (SIR) according to the first corrected array-processed signal; and setting and controlling speed and accuracy of parameter adjustment in predetermined adaptive array processing to be in an optimum state using an estimated SIR value estimated in the SIR estimation step.

9. The adaptive array controlling method according to claim 8, further comprising, between correcting the first array-processed signal and estimating the ratio of the target signal to the interference (SIR), acquiring a second array-processed signal by attenuating the target signal with respect to the other signals, wherein estimating the ratio of the target signal to the interference (SIR) is set as estimating the ratio of the target signal to the interference (SIR) for estimating the ratio of the target signal to the interference (SIR) according to the second array-processed signal and the first corrected array-processed signal.

10. An adaptive array controlling method comprising:

analyzing a first array-processed signal generated by enhancing a target signal, included in a plurality of signals transmitted from a plurality of sensors arranged in an array, with respect to other signals, and acquiring a signal characteristic thereof;

correcting the first array-processed signal corresponding to the acquired signal characteristic and outputting as a first corrected array-processed signal;

acquiring a second array-processed signal by attenuating the target signal with respect to the other signals;

specifying a relative magnitude relationship between the corrected first array-processed signal and the generated second array-processed signal; and setting and controlling speed and accuracy of parameter adjustment in adaptive array processing to be in an optimum state according to the specified relative magnitude relationship.

11. The adaptive array controlling method according to claim 9, wherein an executing content of acquiring the second array-processed signal is configured to set a plurality of pairs of sensors having different sensor intervals based on a plurality of pieces of array sensor information input, and to generate a second array-processed signal using output differences of the pairs of sensors.

12. The adaptive array controlling method, according to claim 11, wherein an executing content of acquiring the second array-processed signal is configured to filter output differences of the plurality of pairs of sensors to thereby specify a plurality of filtering results corresponding to respective differences, and to generate the second array-processed signal using a sum of the plurality of filtering results specified.

13. A computer readable recording medium storing an adaptive array controlling program which is configured to cause a computer to perform:
- a signal characteristic analyzing function to analyze a first array-processed signal generated by enhancing a target signal, included in a plurality of signals transmitted from a plurality of sensors arranged in an array, with respect to other signals, and to acquire a signal characteristic thereof;
- a first array-processed signal correcting function to correct the first array-processed signal according to the generated signal characteristic to thereby acquire a first corrected array-processed signal;
- an output difference calculation function to calculate output differences between a plurality of pairs of sensors having different sensor intervals;
- a second array-processed signal generating function to acquire a second array-processed signal by attenuating the target signal with respect to the other signals using the calculated output differences;
- a magnitude relationship specifying function to acquire a relative magnitude relationship between the corrected first corrected array-processed signal and the generated second array-processed signal; and
- an adaptive array processing controlling function to set and control speed and accuracy of parameter adjustment in adaptive array processing to be in an optimum state according to the relative magnitude relationship specified.

14. An adaptive array processing device comprising:
- a first array-processed signal generating section for processing to enhance a target signal, included in a plurality of signals transmitted from a group of sensors arranged in an array, with respect to other signals to thereby generate a first array-processed signal;
- a second array-processed signal generating section for attenuating the target signal with respect to the other signals to thereby generate a second array-processed signal;
- a correlation elimination section for adaptively eliminating a signal component correlating to the second array-processed signal from the first array-processed signal;
- an analyzing section for analyzing the first array-processed signal to thereby acquire a signal characteristic;
- a correcting section for correcting the first array-processed signal according to the signal characteristic acquired by the analyzing section and outputting the signal as a first corrected array-processed signal;
- a calculation section for calculating a relative magnitude relationship between the first corrected array-processed signal and the second array-processed signal; and
- an arithmetic control section for generating a control signal for controlling speed and accuracy of parameter adjustment in the adaptive processing using the magnitude relationship output from the calculation section, wherein
- by using the control signal output from the arithmetic control section, operation of at least one of the first array-processed signal generating section, the second array-processed signal generating section, and the relative elimination section, is controlled.

15. The adaptive array processing device according to claim 14, wherein
- the second array-processed signal generating section has a sensor pair difference outputting function to set a plurality of pairs of sensors having different sensor intervals based on a plurality of pieces of array sensor information input, calculate output differences of the pairs of sensors, and output them.

16. The adaptive array processing device according to claim 15, wherein
- the second array-processed signal generating section includes a plurality of filters for filtering respective output differences of the plurality of pairs of sensors and an adder for adding filter outputs, and has an addition result outputting function to externally output an addition result of the adder.

17. An adaptive array processing device comprising:
- first array-processed signal generating means for processing to enhance a target signal, included in a plurality of signals transmitted from a group of sensors arranged in an array, with respect to other signals to thereby generate a first array-processed signal;
- second array-processed signal generating means for attenuating the target signal with respect to the other signals to thereby generate a second array-processed signal;
- correlation elimination means for adaptively eliminating a signal component correlating to the second array-processed signal from the first array-processed signal;
- analyzing means for analyzing the first array-processed signal to thereby acquire a signal characteristic;
- correcting means for correcting the first array-processed signal according to the signal characteristic acquired by the analyzing means and outputting the signal as a first corrected array-processed signal;
- calculation means for calculating a relative magnitude relationship between the first corrected array-processed signal and the second array-processed signal; and
- arithmetic control means for generating a control signal for controlling speed and accuracy of parameter adjustment in the adaptive processing using the magnitude relationship output from the calculation means, wherein
- by using the control signal output from the arithmetic control means, operation of at least one of the first array-processed signal generating means, the second array-processed signal generating means, and the relative elimination means, is controlled.

18. An adaptive array processing method comprising:
- processing to enhance a target signal, included in a plurality of signals transmitted from a group of sensors arranged in an array, with respect to other signals to thereby generate a first array-processed signal;
- attenuating the target signal with respect to the other signals to thereby acquire a second array-processed signal;
- analyzing the first array-processed signal when eliminating a signal component correlated to the generated second array-processed signal from the first array-processed signal and outputting, to thereby acquire a signal characteristic;
- correcting the first array-processed signal corresponding to the generated signal characteristic to thereby acquire a first corrected array-processed signal;
- attenuating the target signal with respect to other signals to thereby generate a third array-processed signal;
- acquiring a relative magnitude relationship between the corrected first corrected array-processed signal and the generated third array-processed signal; and
- controlling speed and accuracy of parameter adjustment in the adaptive processing according to the specified relative magnitude relationship.

27

19. The adaptive array processing method, according to claim 18, wherein
an executing content of attenuating the target signal with respect to other signals to thereby generate the third array-processed signal is configured to set a plurality of pairs of sensors having different sensor intervals based on a plurality of pieces of array sensor information input, and to generate the third array-processed signal using output differences of the pair of sensors.

20. The adaptive array processing method, according to claim 19, wherein
the executing content of attenuating the target signal with respect to other signals to thereby generate the third array-processed signal is configured to filter respective output differences to specify a plurality of filtering results corresponding to the respective differences, and to generate the third array-processed signal using a sum of the plurality of specified filtering results.

21. A computer readable storing medium storing an adaptive array processing program configured to cause a computer to perform:
a first array-processed signal generating function to process to enhance a target signal, included in a plurality of signals transmitted from a group of sensors arranged in an array, with respect to other signals to thereby generate a first array-processed signal;
a second array-processed signal generating function to attenuate the target signal with respect to the other signals to thereby acquire a second array-processed signal;
a correlative component eliminating function to eliminate a signal component correlated to the generated second array-processed signal from the first array-processed signal and output;
a signal characteristic generating function to analyze the first array-processed signal in which the target signal is enhanced with respect to the other signals to thereby acquire a signal characteristic;
a first array-processed signal correcting function to correct the first array-processed signal corresponding to the generated signal characteristic to thereby acquire a first corrected array-processed signal;
an output difference calculating function to set a plurality of pairs of sensor having different sensor intervals based on a plurality of pieces of array sensor information input, and to calculate output differences between the pairs of sensors;
a second array-processed signal generating function to generate a second array-processed signal, in which the target signal is attenuated with respect to the other signals, using the output differences;
a magnitude relationship specifying function to acquire a relative magnitude relationship between the corrected first corrected array-processed signal and the generated second array-processed signal; and
an adaptive array processing controlling function to set and control speed and accuracy of parameter adjustment in the adaptive processing to be in an optimum state using the specified relative magnitude relationship.

22. An adaptive array control device comprising:
a fricative sound detecting section for analyzing a first array-processed signal formed by enhancing a target signal, included in a plurality of signals transmitted from a plurality of sensors arranged in an array, with respect to other signals, and detecting as a fricative sound;

28 an enhancing section for enhancing amplitude of the first array-processed signal when detected as a fricative sound, and outputting the signal as a first enhanced array-processed signal;
an SIR estimating section for estimating a ratio of the target signal to interference (SIR) according to the first enhanced array-processed signal; and
an arithmetic control section for generating a control signal for controlling speed and accuracy of parameter adjustment in predetermined adaptive array processing using an estimated SIR value.

23. The adaptive array control device, according to claim 22, wherein the fricative sound detecting section detects the signal as a fricative sound when flatness of high range power and spectrum of the first array-processed signal is larger than a predetermined threshold.

24. An adaptive array control device comprising:
fricative sound detecting means for analyzing a first array-processed signal formed by enhancing a target signal, included in a plurality of signals transmitted from a plurality of sensors arranged in an array, with respect to other signals, and detecting as a fricative sound;
enhancing means for enhancing amplitude of the first array-processed signal when detected as a fricative sound, and outputting the signal as a first enhanced array-processed signal;
SIR estimating means for estimating a ratio of the target signal to interference (SIR) according to the first enhanced array-processed signal; and
arithmetic control means for generating a control signal for controlling speed and accuracy of parameter adjustment in predetermined adaptive array processing using an estimated SIR value.

25. An adaptive array controlling method comprising:
analyzing a first array-processed signal formed by enhancing a target signal, included in a plurality of signals transmitted from a plurality of sensors arranged in an array, with respect to other signals, and detecting as a fricative sound;
when detected as a fricative sound, enhancing amplitude of the first array-processing signal to thereby acquire a first enhanced array-processed signal; and
setting and controlling speed and accuracy of parameter adjustment in a predetermined adaptive array processing to be in an optimum state using a ratio of the target signal to interference (SIR), the ratio being estimated according to the first enhanced array processing signal.

26. The adaptive array controlling method, according to claim 25, wherein detection of the fricative sound is performed based on an appreciation that flatness of high-range power and spectrum of the first array-processed signal is larger than a predetermined threshold.

27. A computer readable recording medium storing an adaptive array control program configured to cause a computer to perform:
a fricative sound detecting function to analyze a first array-processed signal formed by enhancing a target signal, included in a plurality of signals transmitted from a plurality of sensors arranged in an array, with respect to other signals, and to detect as a fricative sound;
a first array-processing signal enhancing function to enhance amplitude of the first array-processed signal when detected as a fricative sound to thereby acquire a first enhanced array-processed signal;
an SIR estimating function to estimate a ratio of the target signal to interference (SIR) according to the first enhanced array-processed signal; and an adaptive array processing control function to set and control speed and accuracy of parameter adjustment in predetermined adaptive array processing to be in an optimum state using an estimated SIR value.

28. The computer readable recording medium storing the adaptive array control program, according to claim 27, wherein detection of the fricative sound is detected as a fricative sound when flatness of high-range power and spectrum of the first array-processed signal is larger than a predetermined threshold.

* * * * *